United States Patent [19]

Dower

[11] Patent Number: 5,430,381
[45] Date of Patent: Jul. 4, 1995

[54] APPARATUS FOR ELECTROSTATICALLY IMAGING THE SURFACE OF AN OBJECT LOCATED NEARBY

[75] Inventor: Roger G. Dower, Vancouver, Canada

[73] Assignee: Antivision Systems Corp., Vancouver, Canada

[21] Appl. No.: 131,497

[22] Filed: Oct. 4, 1993

Related U.S. Application Data

[63] Continuation of Ser. No. 591,042, Oct. 1, 1990, abandoned.

[30] Foreign Application Priority Data

Sep. 29, 1989 [CA] Canada ............................ 614905-7

[51] Int. Cl.[6] .................. G01R 29/12; G01B 7/28; G01B 7/34
[52] U.S. Cl. ................................... 324/452; 324/457; 324/662; 324/112; 382/312
[58] Field of Search ....................... 324/452–458, 324/661–663, 687, 690; 346/153.1, 155; 382/58

[56] References Cited

U.S. PATENT DOCUMENTS

| | | | |
|---|---|---|---|
| 3,221,171 | 11/1965 | Locher | 324/687 X |
| 4,082,990 | 4/1978 | Stiles et al. | 324/662 X |
| 4,112,355 | 9/1978 | Gibson, Jr. et al. | 324/662 |
| 4,134,063 | 1/1979 | Nicol et al. | 324/661 |
| 4,451,780 | 5/1984 | Ogasawara | |
| 4,562,430 | 12/1985 | Robinson | 324/661 X |
| 4,686,531 | 8/1987 | Shambroom et al. | 324/661 X |
| 4,814,691 | 3/1989 | Garbini et al. | 324/661 |
| 4,899,101 | 2/1990 | Porges | 324/663 |
| 4,972,154 | 11/1990 | Bechtel et al. | 324/690 X |
| 5,130,661 | 7/1992 | Beck et al. | 324/663 |
| 5,281,921 | 1/1994 | Novak et al. | 324/662 X |
| 5,363,051 | 11/1994 | Jenstrom et al. | 324/661 |

FOREIGN PATENT DOCUMENTS 844986 7/1981 U.S.S.R. .
88/01747 3/1988 WIPO .

*Primary Examiner*—Kenneth A. Wieder
*Assistant Examiner*—Diep Do
*Attorney, Agent, or Firm*—Shlesinger Arkwright & Garvey

[57] ABSTRACT

Electrostatic imaging apparatus comprises a plurality of electrostatic radiators and a signal generator for driving the radiators to produce an electrostatic field having characteristics modifiable by the presence of an object within the field. The field characteristics are detected and processed to produce output signals representative of a surface profile of the object.

13 Claims, 23 Drawing Sheets

APPARATUS FOR ELECTROSTATICALLY IMAGING THE SURFACE OF AN OBJECT LOCATED NEARBY

This application is a continuation of application Ser. No. 07/591,042, filed Oct. 1, 1990 now abandoned.

FIELD OF THE INVENTION

This invention relates to apparatus for measuring physical characteristics of objects and, in particular, to apparatus for imaging a surface of an object located nearby.

BACKGROUND OF THE INVENTION

In recent years, considerable advances have been made in the field of machine vision technology based upon optics. Techniques for mapping or imaging the surface of objects using such technology are well known. However, machine vision systems that rely upon optics are often unsuitable for the inspection of surfaces in situations where the roughness of the surface is of the order of the wavelength of the light used, or where there are large variations in surface reflective characteristics, or where contrast ratios are small. For example, plastic surfaces and dirty metal surfaces can be difficult to inspect.

In industrial environments, such difficulties may be compounded by fluctuations in background patterns or lighting conditions.

In the field of electrostatics, proximity sensors have been used in a wide range of applications for measurement of physical quantities. Such sensors are based on capacitance variation due to electrode displacement or due to local dielectric or conductivity variations. For example, three-electrode sensors with symmetrical clocks driving two parallel plates, and with a sensor electrode between, can measure small variations of position of the sensor electrode relative to the other two. As another example, gas pressure can vary the dielectric constant of a capacitor which is then inserted into a bridge circuit.

Further examples include elevator-type capacitance switches which may have a clock signal capacitively coupled to a detector, this coupling effectively being interrupted by a Faraday shield, whereby the contact of a finger shunts the signal to ground; level indicators for fluids which may make use of a capacitance varied according to the dielectric constant of, and the quantity of, fluid in a tank; and proximity fuzes for armaments which may make use of a change in capacitance caused by an externally applied object.

The primary object of the present invention is to provide new and improved apparatus for imaging a surface of an object located nearby, such apparatus being less sensitive to problems of the type outlined above for machine vision systems based upon optics.

SUMMARY OF THE INVENTION

In accordance with a broad aspect of the present invention, there is provided an electrostatic imaging apparatus comprising a plurality of electrostatic radiators (such as electrodes) and signal generating means operatively connected to the radiators to produce an electrostatic field having characteristics modifiable by the presence of an object within the field. An electrostatic signal detection and processing means senses characteristics of the field and, in response, produces output signals representative of a surface profile of the object.

In a preferred embodiment, the electrostatic signal detection and processing means comprises a signal conditioning means and a signal conversion means. The signal conditioning means is operatively connected to electrostatic detectors (such as electrodes) positioned within the field, and outputs a signal related to the electrostatic field gradient at each detector. The signal conversion means takes the latter output and produces therefrom the signals representative of surface profile.

Depending upon the application, a surface profile may be imaged in two or three dimensions.

Both conductive and dielectric surfaces can be imaged. Further, in some cases where the conductivity of an overlying layer is low, the present invention may be utilized to image an underlying surface. For example, the surface, of a metal can may be imaged through a dielectric lacquer coating.

The foregoing and other features and advantages of the present invention will now be described with reference to the drawings.

DETAILED DESCRIPTION

Before describing the electrostatic imaging apparatus of FIG. 1 in detail, reference will first be made to FIGS. 2 through 9 to provide a better understanding of fundamental principles on which operation of the apparatus depends.

Figure 2:
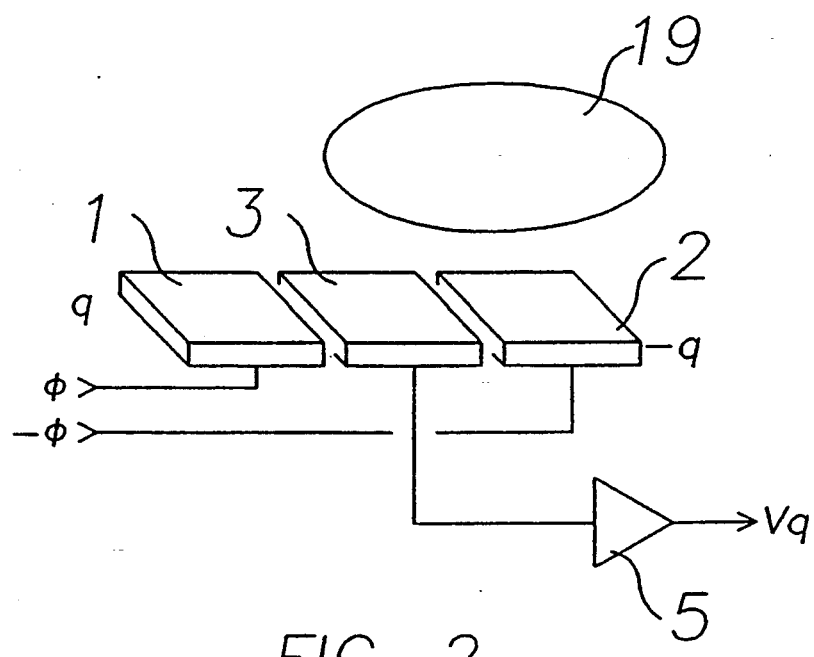
FIG. 2 shows a sensor configuration with a pair of electrostatic radiators and an electrostatic detector which are all co-planar, with an object positioned nearby.

FIG. 2 shows electrode 3 serving as an electrostatic detector positioned between a pair of electrodes 1, 2 which serve as electrostatic radiators. All the electrodes are co-planar but, as is discussed hereinafter, other geometries are possible and are contemplated by the present invention. The output signal from detector electrode 3 is conditioned by buffer amplifier 5 so that the strength of the signal as represented by voltage $V_q$ can be monitored without unduly loading detector electrode 3 and influencing the measurement.

Electrode 1 is shown as having a charge q generated by an applied input voltage $\phi$; electrode 2 is shown as having a charge $-q$ generated by an applied voltage-$\phi$. Necessarily, an electrostatic field (not illustrated) is set up by the charges in the region of the electrodes. The strength of this field at the position of detector electrode 3 is sensed by electrode 3. However, the field strength at any point, and hence the output of electrode 3, is influenced by the presence of the object generally designated 19 located in the field near the electrodes. Object 19 is not part of the invention and appears merely for purposes of illustration.

Figure 3:
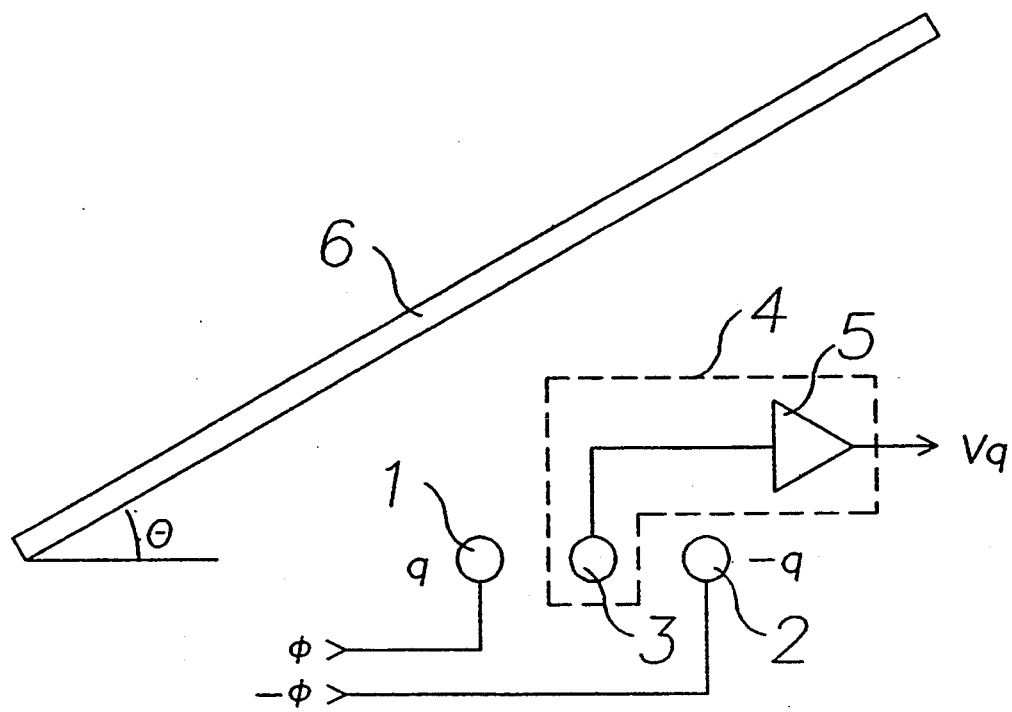
FIG. 3 shows elements of an idealized single pixel sensor configuration, with a conductive plane positioned nearby.

A mathematical analysis describing the operation of the sensor configuration shown in FIG. 2 can be greatly simplified while still illustrating the principles of operation by assuming, as is shown in FIG. 3, that electrodes 1,2,3 have no finite size but are instead points 1,2 and 3, and that object 19 is an infinite plane 6.

In FIG. 3, radiating electrodes 1,2 have opposite point charges q and $-q$, generated by input voltages $\phi$ and $-\phi$. Charges q, $-q$ are equidistant from sensing electrode 3. Detector electrode 3 and amplifier 5 together act as an electrostatic signal detector 4 producing an output voltage $V_q$. Plane 6 is a conductive plane and extends at an angle $\Theta$ in relation to the electrodes.

Figure 4:
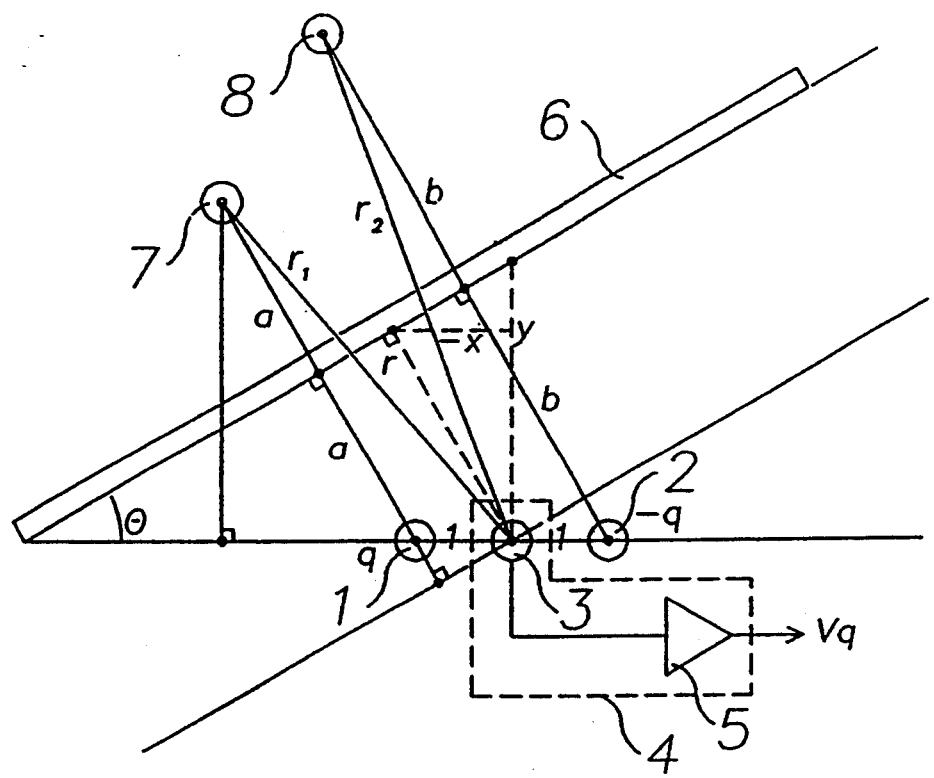
FIG. 4 shows FIG. 3, with the addition of construction lines used for signal analysis.

FIG. 4 shows construction lines and symbols that may be used for signal analysis. The hidden charge method is used. A pair of hidden charges at 7, 8 are located symmetrically to the two existing charges at 1,2 with respect to the lower surface of plane 6. The voltage V that would appear at 3 if the electrode was not loaded may be calculated according to the following equation where distance y is measured vertically from sense electrode 3 to the lower surface of plane 6 and distance r is the shortest distance from sense electrode 3 to plane 6:

$V = \epsilon q(1/r_1 - 1/r_2)$ where:

$r_1 = (4a^2 + 4a \sin \Theta + 1)^{\frac{1}{2}}$
$r_2 = (4b^2 - 4b \sin \Theta + 1)^{\frac{1}{2}}$
$a = r - \sin \Theta$
$b = r + \sin \Theta$
$r = y \cos \Theta$ Voltage V is reduced by shunt capacitance at the input of amplifier 5, which provides gain and yields output signal $V_q$. Detector electrode 3 capacitance affects the input charge sensed by this circuit, and thus output voltage $V_q$. The capacitance varies according to the effect of plane 6, but the amplifier is assumed to have an output voltage proportional to V as calculated above. In practical applications, this approximation is usually sufficient, due to the small proportional change of total amplifier input capacitance according to movement of plane 6.

Figure 5:
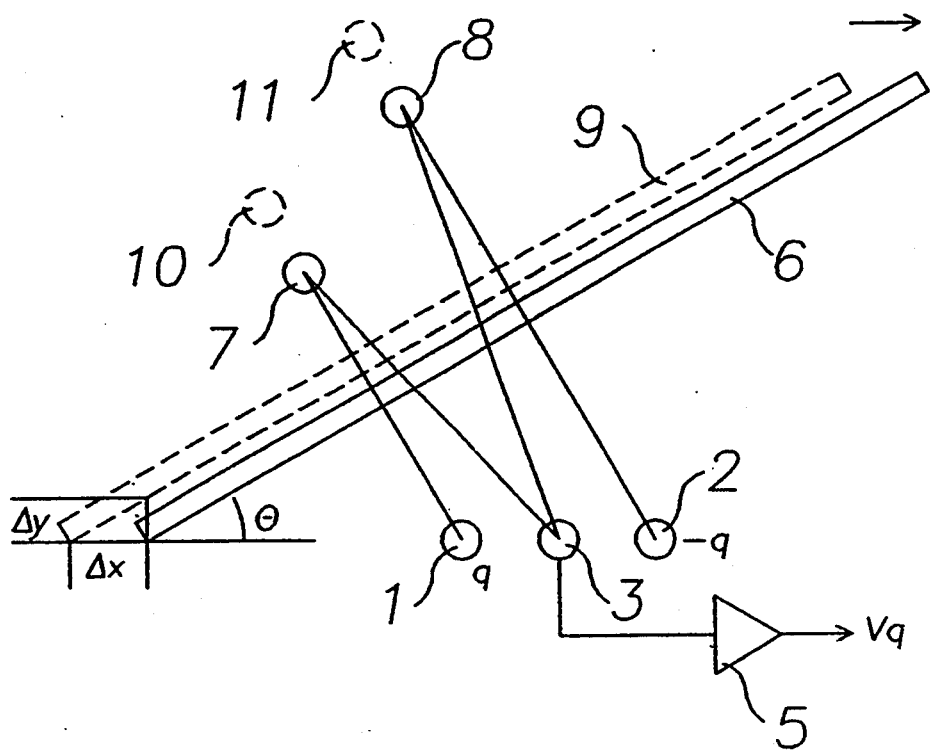
FIG. 5 shows construction lines for the analysis of movement when the conductive plane in FIG. 3 is moved laterally.

FIG. 5 shows that a displacement $\Delta x$ to the right will result in an equivalent displacement vertically $\Delta y$ of plane 6 according to tan Θ. As the plane is so displaced, the output $V_q$ is reduced, where $V_q$ is calculated as for FIG. 4. Charges at 1,2 are mirrored as hidden charges at 7,8, in positions changed from initial positions 10,11.

Figure 6:
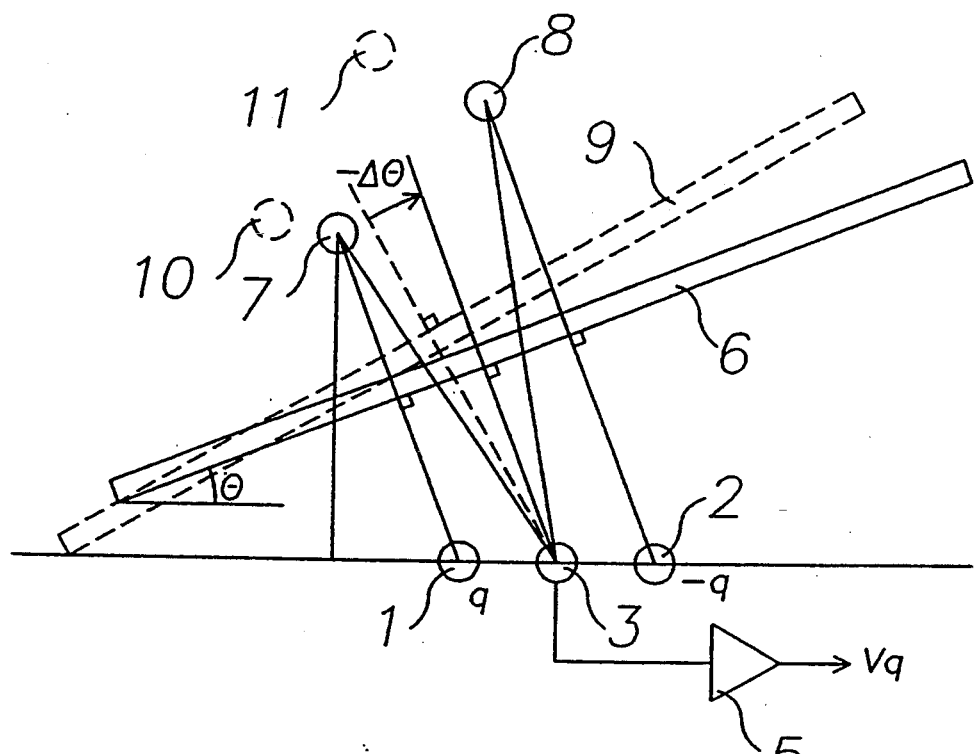
FIG. 6 shows construction lines for the analysis of movement when the conductive plane in FIG. 3 is rotated clockwise.

FIG. 6 shows the effect of rotation, which causes the position of the hidden charges at 7,8 to move from initial positions 10, 11. An object can be moved past the sensor, and the signal $V_q$ will vary according to x,y,Θ. For an object passing a sensor at a uniform distance y, the output $V_q$ will be a function of x and Θ, where Θ is an approximation of the surface inclination relative to the sensor, measured above it. For objects with large dimensions relative to the spacing of the sensor electrodes, the approximation is reasonable. The output signal $V_q$, corrected for height, will approximate the dot product of the surface gradient and the line between the two charges at 1,2.

Figure 7:
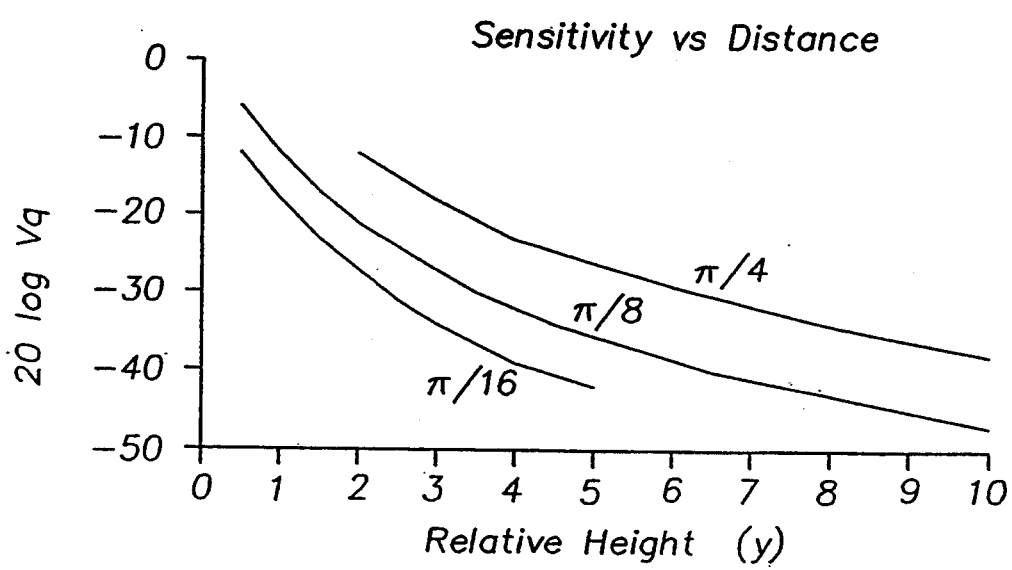
FIG. 7 is a graph showing an approximation of the output of the sensor configuration in FIG. 3, as a function of the height and angle of the plane.

FIG. 7 shows on a logarithmic scale signal output calculated using the above equations for the sensor configuration of FIG. 3. The relationship between signal output and distance of the plane, measured in inter-electrode spacings, from the sense electrode is shown for three different angles Θ of plane 6 with the sensor.

It can be seen that output signal $V_q$ is approximately a derivative of surface height, corresponding to the angle Θ between plane 6 and the base of the electrodes 1,2,3. Further, there is attenuation of the signal with increasing distance.

Figure 8:
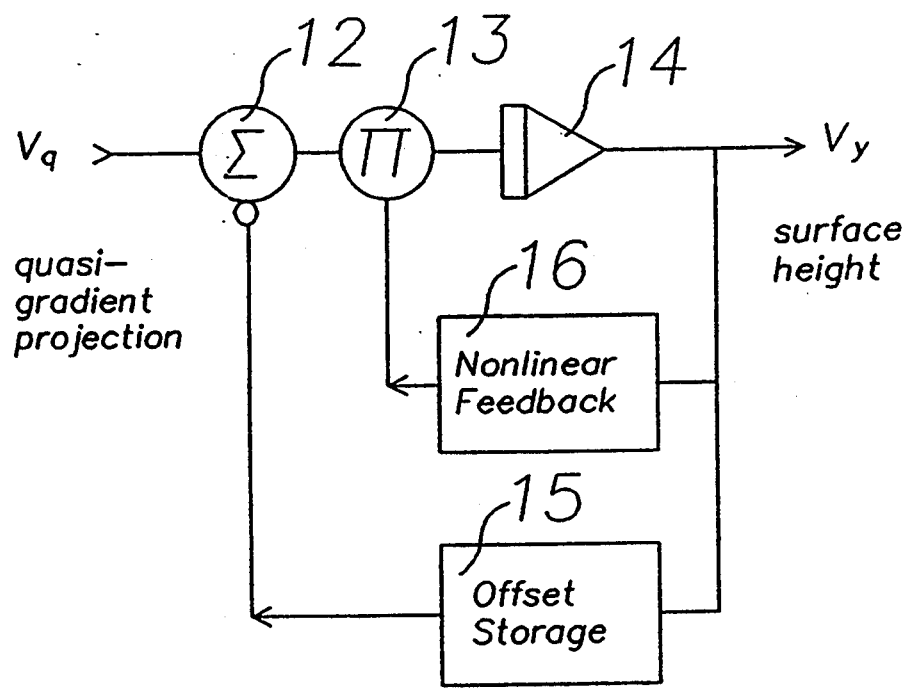
FIG. 8 is a diagram of a non-linear integrator used to derive the height of the conductive plane above the sensor configuration in FIG. 3.

To obtain an accurate determination of height y, compensation should be made for the attenuation of signals with y. FIG. 8 is a block diagram illustrating a hardware implementation of such compensation.

In the circuitry of FIG. 8, height as represented by output $V_y$ is derived from signal $V_q$ by means of an integrator 14 with two feedback loops.

The input signal $V_q$ has pixel offset errors removed in a conventional way by offset feedback loop 15 including difference circuit 12. Gain correction as a function of distance is achieved by nonlinear feedback loop 16, the transfer function being determined empirically.

In practice, it will be appreciated that the transfer function of nonlinear feedback loop 16 will depend intimately on the particular sensor configuration, and the particular working environment. The sensor elements will not be ideal points; ground planes or other surfaces of the packaging holding or containing the sensor may affect the electrostatic fields generated; and various external factors may affect performance. Accordingly, for a particular application where it is desired to accurately determine height, it is contemplated that samples of the object to be imaged will be used to permit empirical determination of the required transfer function. Once the transfer function is determined, the circuit implementation will be a routine matter.

It will also be appreciated that the overall circuit function achieved by the circuitry of FIG. 8 can be implemented with differing hardware configurations or with software. In a software configuration, the nonlinear transfer function may be stored in a lookup table for convenience.

Figure 9:
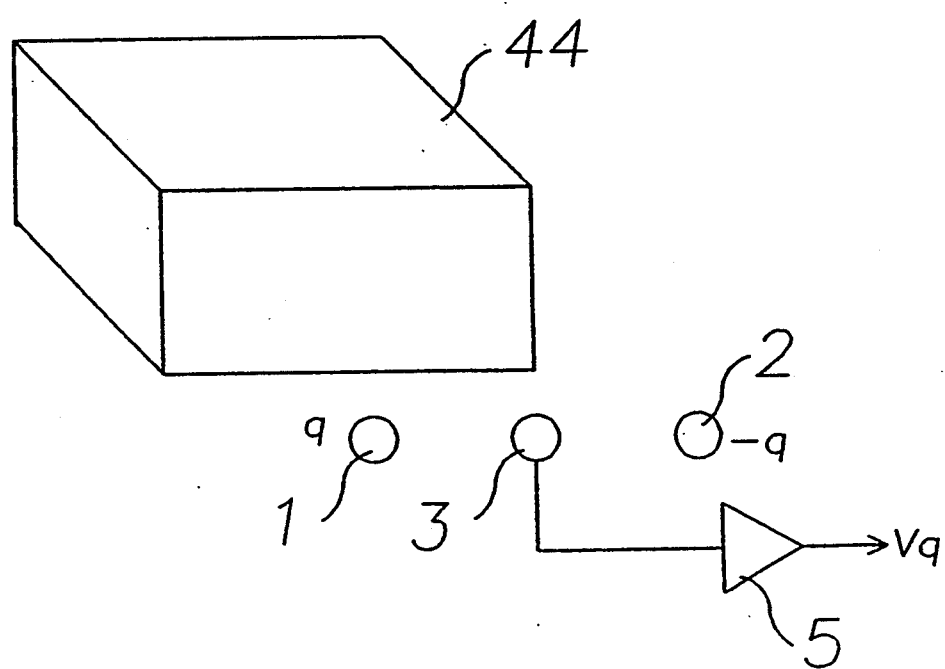
FIG. 9 shows a sensor of the type shown in FIG. 3, with a dielectric object positioned nearby.

The sensor configuration in FIG. 9, with a dielectric object 44 located nearby, is simply intended to emphasize that the utility of the invention is not limited to the sensing or imaging of conductive objects. The principles of analysis for a dielectric object will necessarily be the same as in the case of conducting objects but with appropriate modifications of hidden charge position and magnitude depending on the dielectric constant or constants involved.

Figure 10:
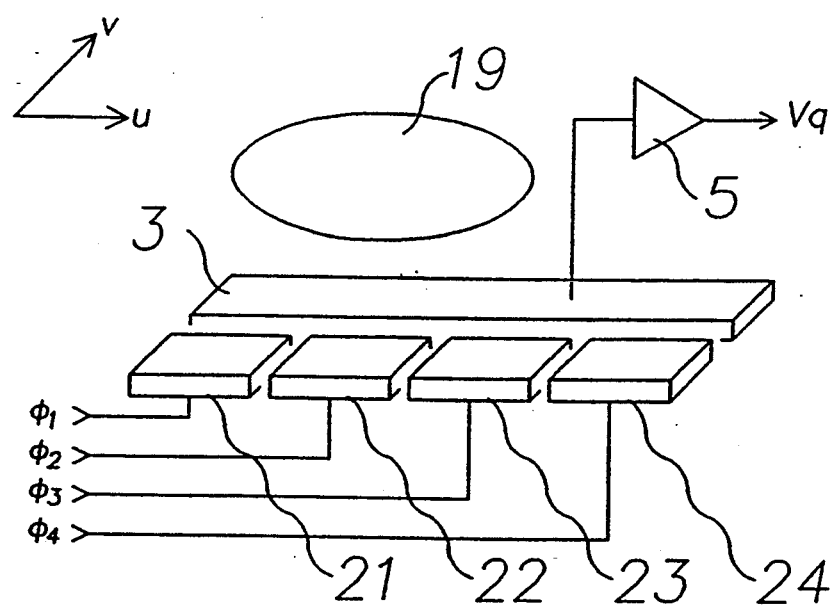
FIG. 10 shows a sensor configuration with several electrostatic radiators and one electrostatic detector.

FIG. 10 shows a sensor configuration using many electrostatic radiators 21,22,23,24, driven by clock signals $\phi_1,\phi_2,\phi_3,\phi_4$ and one electrostatic detector 3. This sensor configuration is capable of extracting one pixel of information per radiator less one, when inspecting a stationary object. This sensor configuration is described in further detail in the description of FIGS. 11-15. FIG. 10 shows only one of many possible geometries in accordance with the present invention.

Figure 1:
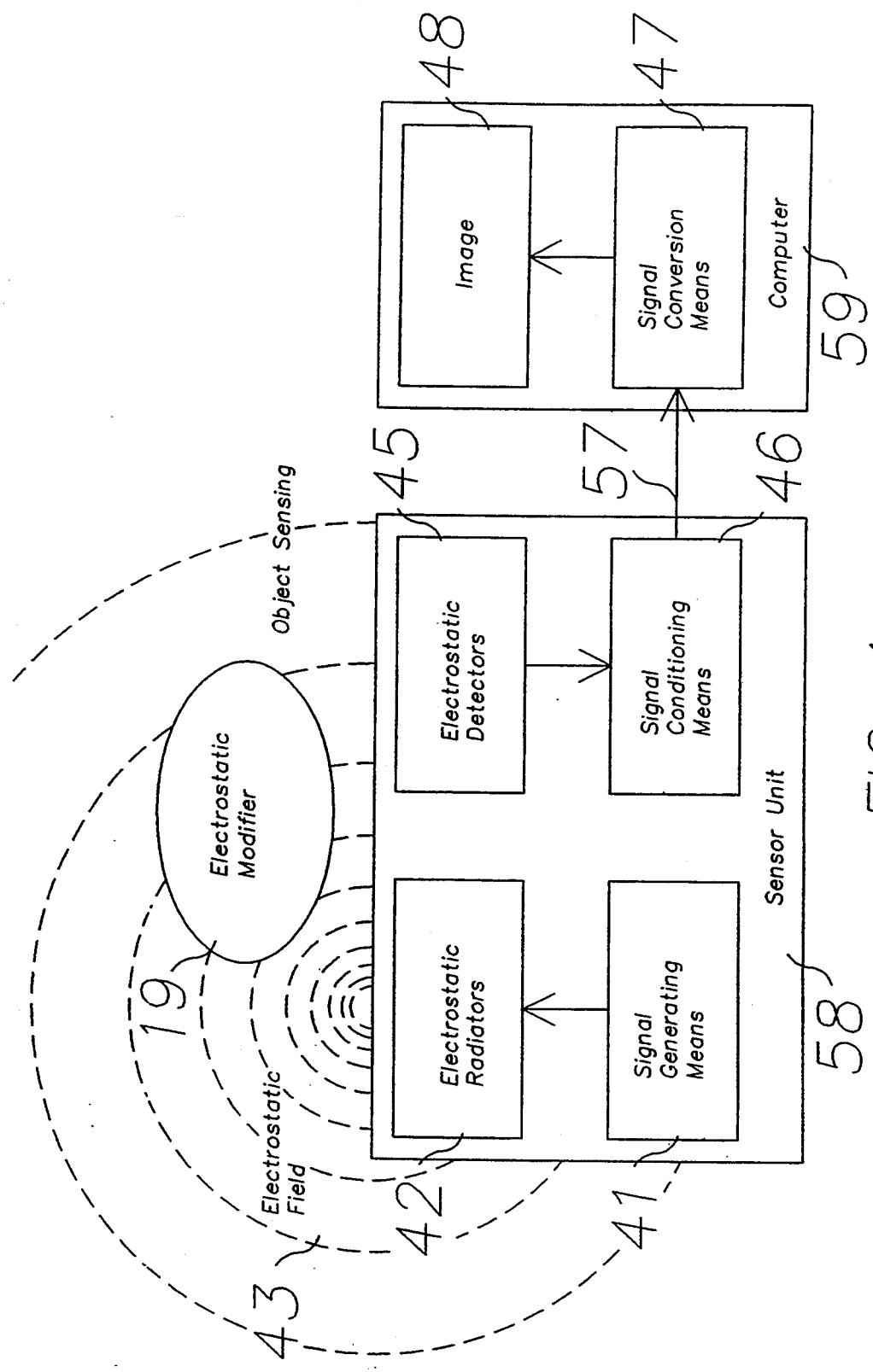
FIG. 1 is a diagram of a system including electrostatic imaging apparatus in accordance with the present invention.

Referring now to FIG. 1, sensor unit 58 includes a signal generating means 41 which drives a plurality of electrostatic radiators 42. An electrostatic field as produced by electrostatic radiators 42 is illustrated by broken lines 43. An electrostatic modifier 44 is shown within the field. It will be understood that lines 43 are merely illustrative, and are not intended to be an accurate portrayal of actual field lines (which, in any case, would be distorted depending on the actual configuration of modifier 44).

The electrostatic field that is formed, as modified by electrostatic modifier 44, is sensed by electrostatic detectors 45. The resulting signals are converted to a serial format by signal conditioning means 46, and are sent via serial link 57 to signal conversion means 47 which is implemented in computer 59.

Computer 59 can be any suitable computer; for example, an AT-compatible with an EGA colour screen has been used. Computer 59 implements signal conversion means 47, and produces output image 48.

Figures 15A, 15C:
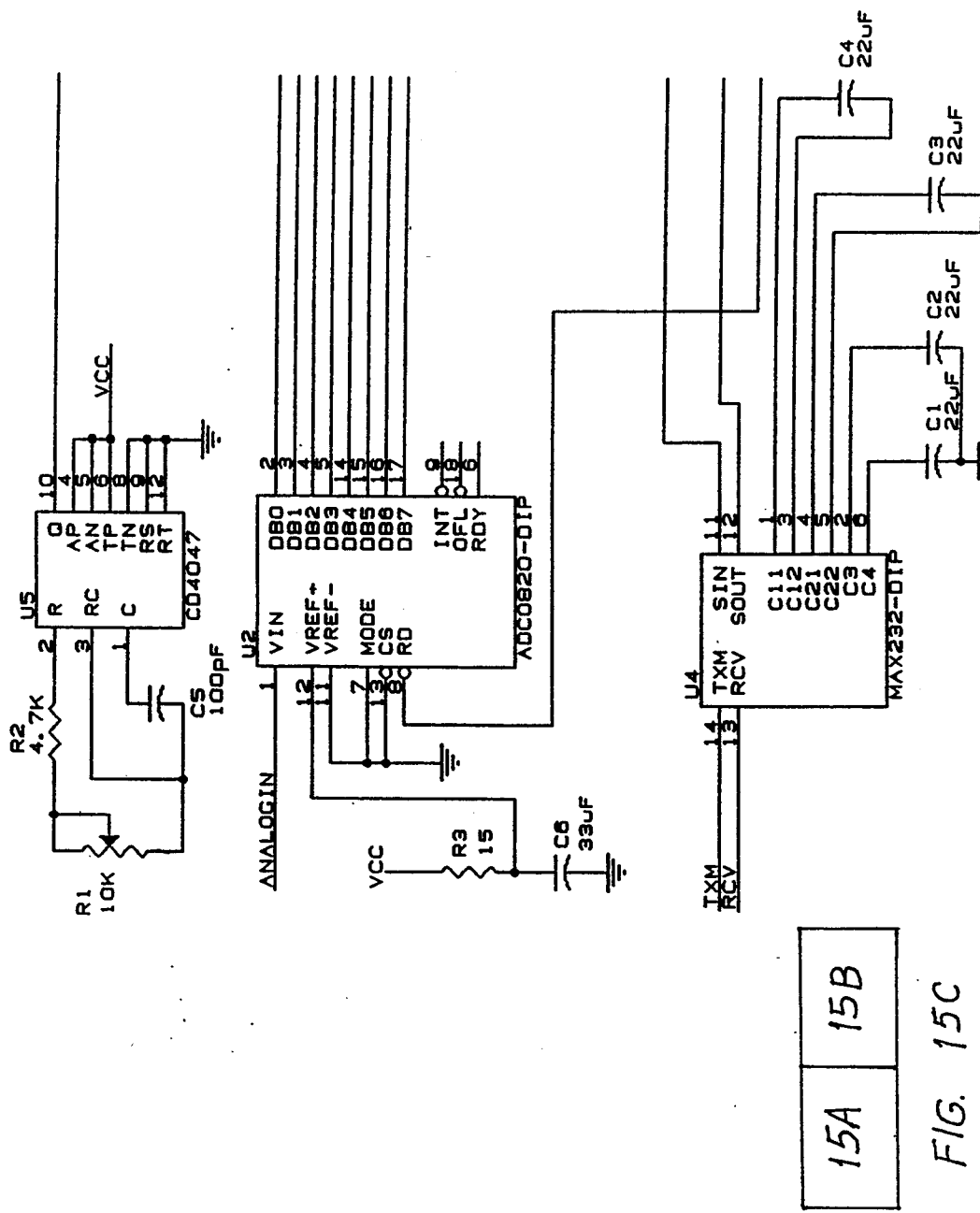
FIG. 15 consisting of FIGS. 15A and 15B assembled as shown in FIG. 15C is a circuit diagram of signal generating means and digital circuits forming part of the signal conditioning means in FIG. 1.
Figure 15B:
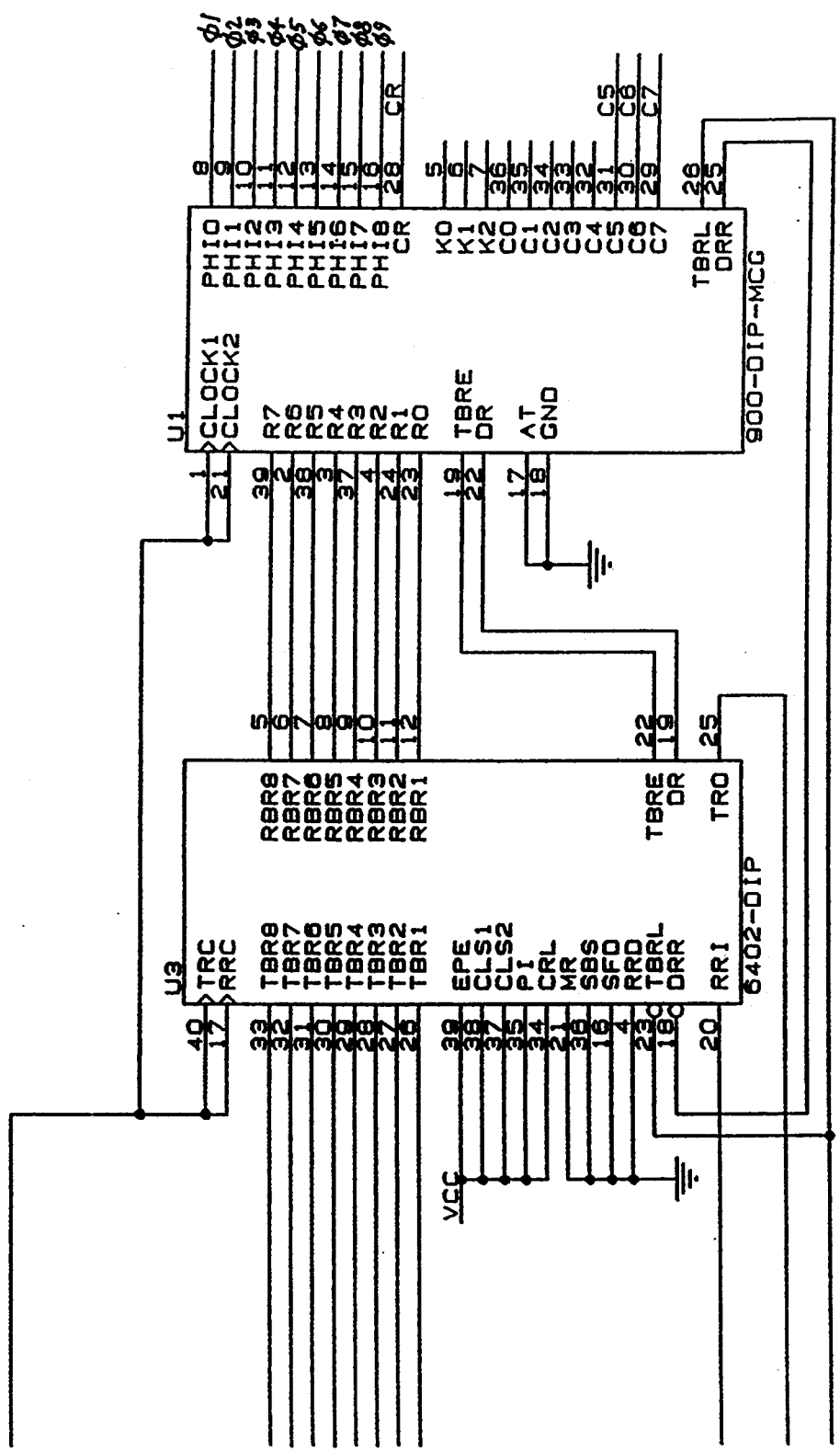

Not shown in FIG. 1 is a serial link from computer 59 to sensor unit 58, with which computer 59 triggers each scan line to start. Sensor unit 58 starts a scan line upon receipt of any byte from computer 59. Scan lines consist of 8 data bytes sent in sequence. The description below of FIG. 15 provides more detailed information.

Signal conversion means 47 shall now be referred to by the term "software". The software measures and displays a representation of surface profiles using data from signal conditioning means 46. An object to be sensed (not shown) is passed over the electrostatic radiators 42 through field 43, which is a near-field pattern. Each scan line is processed to yield a representation of a surface profile along one line, and an image is constructed from a series of scan lines, made as the object (not shown) passes the surface.

As described below in more detail, the software implements the following functions: keyboard control, data file input and output, transmission of start bytes to sensor unit 58, receipt of 8 data bytes per scan line, offset removal, interpolation, integration, scaling, and display.

Figure 16:
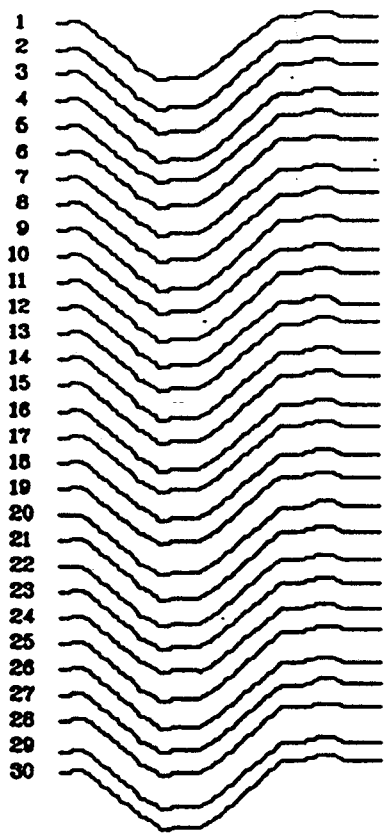
FIG. 16 shows a sample image output of the apparatus in FIG. 1 when used to inspect a heat-sealed plastic food package, with a good seal.

A typical display, as shown in FIG. 16, consists of 30 scan lines, the scan line spacing being a function of object velocity and scan line frequency.

FIG. 16 is an output produced from a plastic package seal, where the seal could be seen physically as a depression of about 2 to 3 mm width, and 0.5 mm depth. The seal is viewed in cross-section. In this example, the package had a top surface with a metal layer embedded between two plastic layers, and was defect free.

Figure 17:
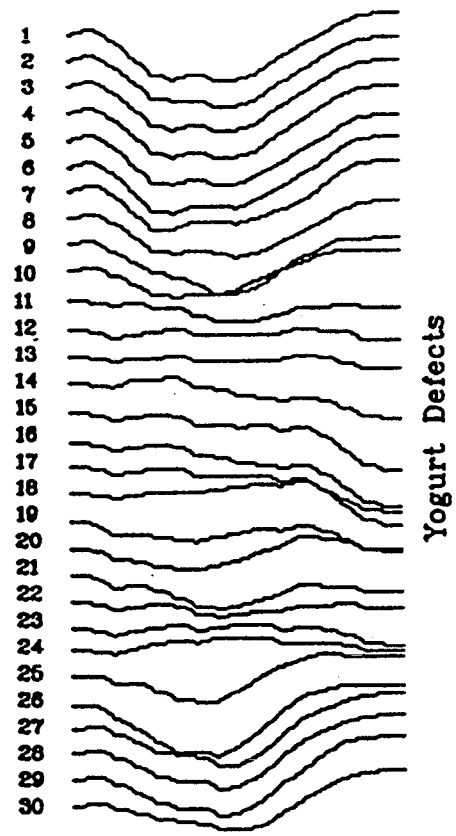
FIG. 17 shows a sample image output of the apparatus in FIG. 1 when used to inspect a heat-sealed plastic food package having a defective seal with air bubbles.

In simple terms, the data from sensor unit 58 are treated as if they correspond to a slope function, and are integrated to produce a height function. No non-linear scaling is used. Therefore, the surface profile represented by the scan lines in FIG. 16 is a distorted image. However, the utility of this is illustrated if reference is now made to FIG. 17 which is an output again produced from a plastic package seal, but where the seal was defective, having a number of air bubbles located along a section of the seal, causing the heat seal depression to be lost, in an irregular pattern, as shown. As can be seen, it is readily apparent that the surface profile of the bad seal as represented in FIG. 17 is highly irregular whereas that of the good seal as represented in FIG. 16 is uniform. Thus a 1:1 mapping of the seal's actual profile to the displayed profile is not necessary to determine that there is irregularity—and nonlinear scaling is therefore not used.

Figure 11:
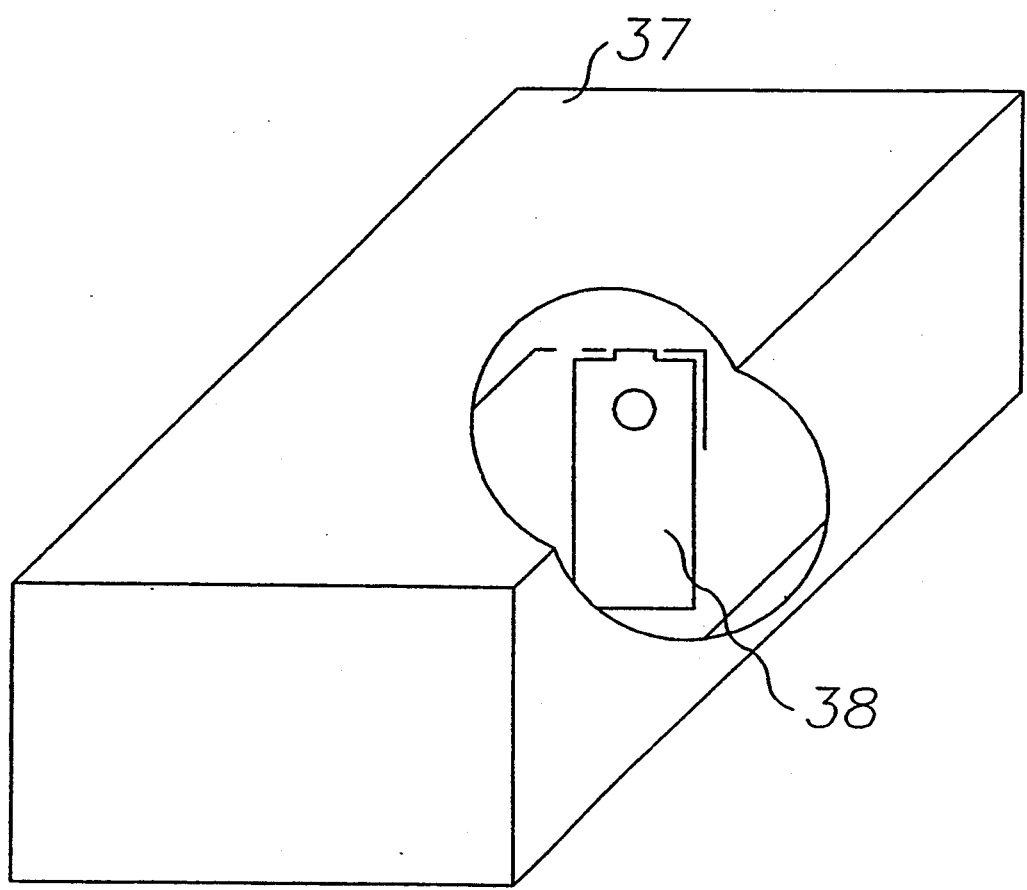
FIG. 11 illustrates packaging, partially cut away, of a portion of the imaging apparatus shown in FIG. 1.

FIG. 11 illustrates the implementation of sensor unit 58 in metal box 37 which provides electrostatic shielding and a mechanical reference for inspection of objects (not shown) placed on the top surface, in the electrostatic near field generated by the electrostatic radiators. The electrostatic radiators of extend upward to a small window (not shown), to lie flush with the top surface. An external 12 VDC power supply (not shown) is used to provide operating power.

Figure 12:
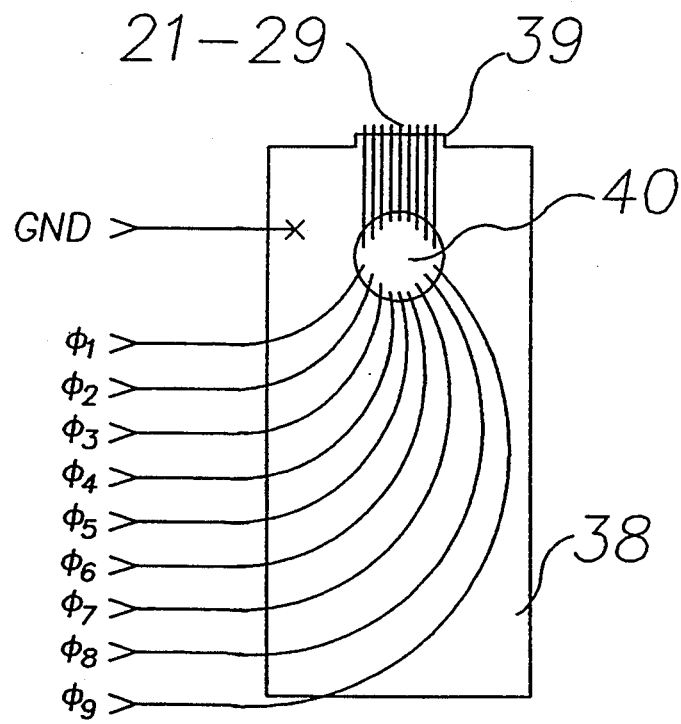
FIG. 12 shows a line scan sensor comprising nine electrostatic radiators and one electrostatic detector, as used in the apparatus of FIG. 1.
Figure 13:
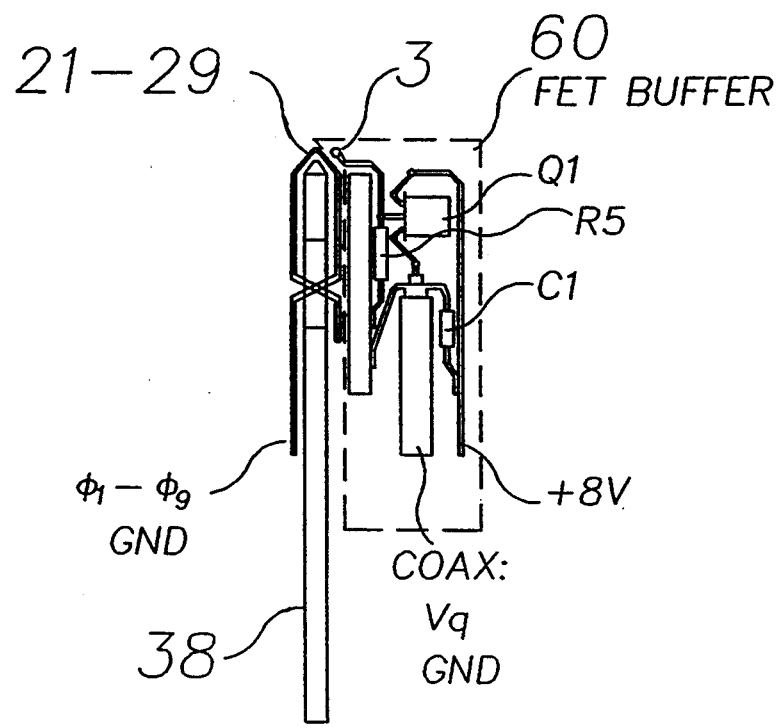
FIG. 13 is a side view of the line scan sensor in FIG. 12.
Figures 14A, 14E:
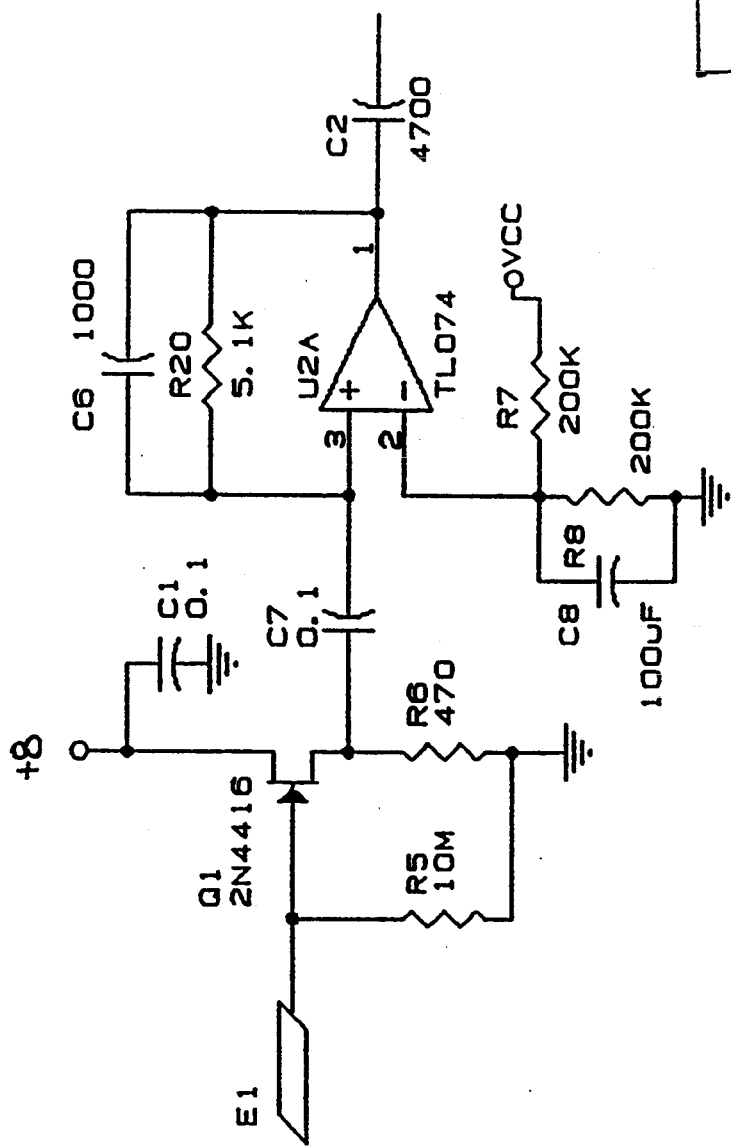
FIG. 14 consisting of FIGS. 14A, 14B, 14C and 14D assembled as shown in FIG. 14E is a circuit diagram of analog circuits forming part of the signal conditioning means in FIG. 1.
Figure 14B:
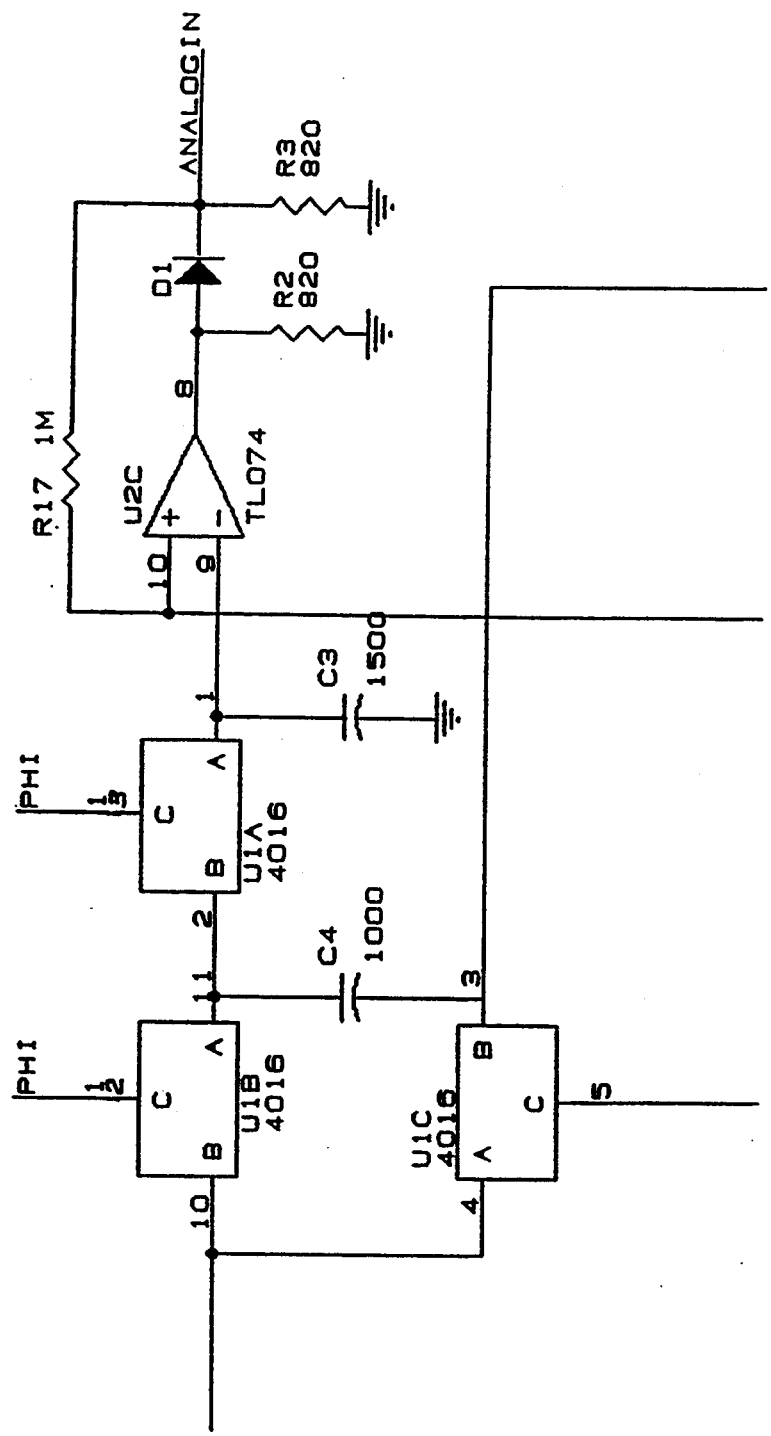
Figure 14C:
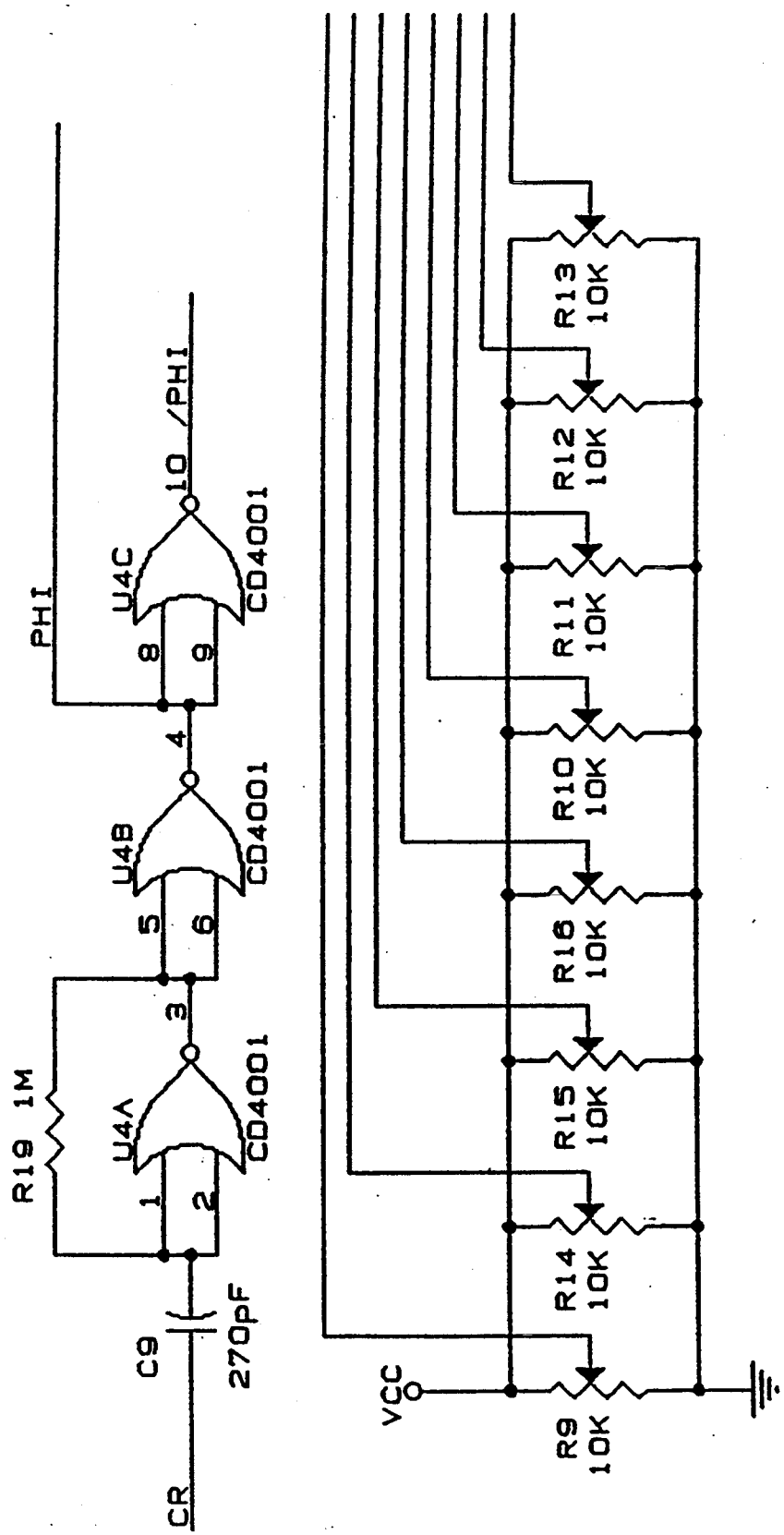
Figure 14D:
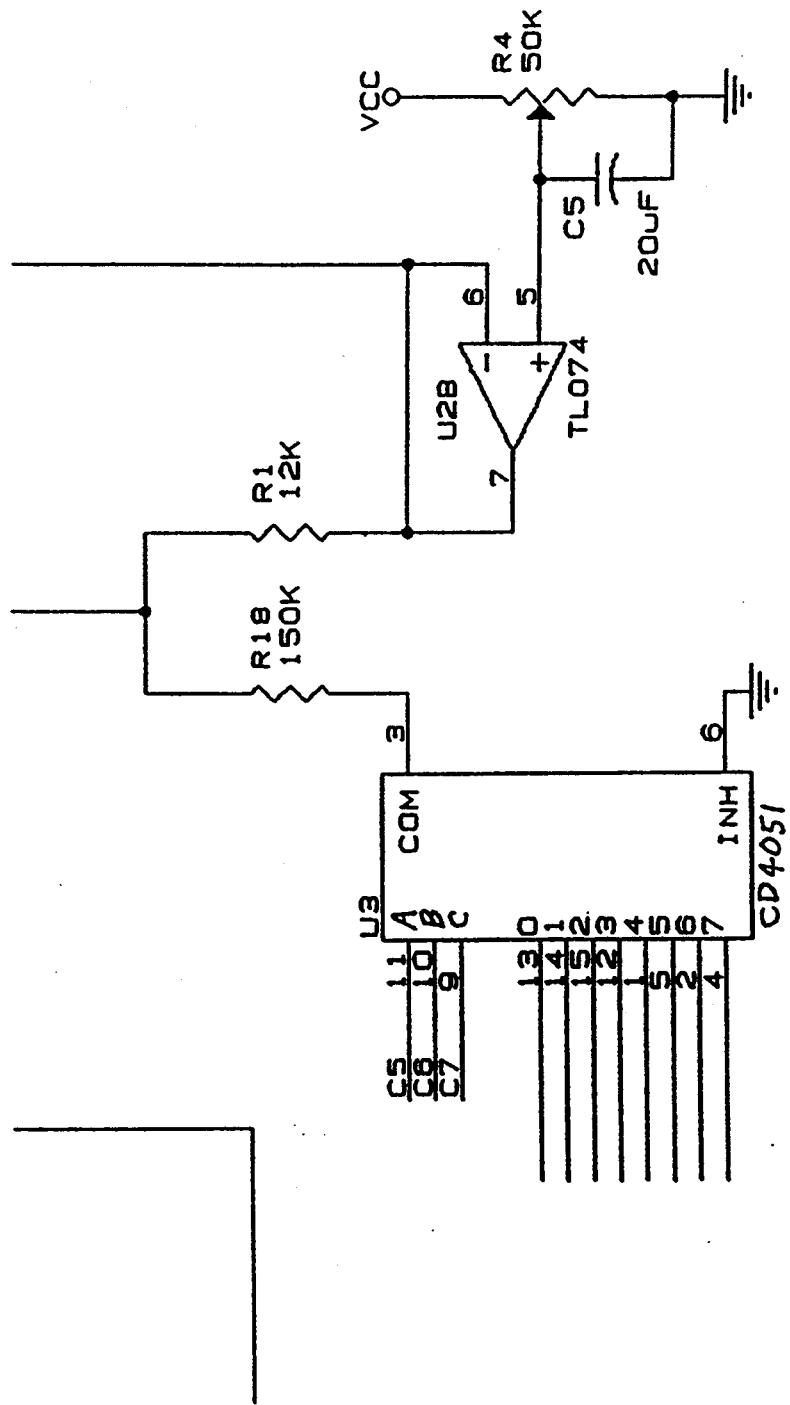

FIGS. 12 and 13 show the electrostatic radiators and detector used to obtain the output images shown in FIGS. 16 and 17. The electrostatic radiators and detector are mounted on two-sided printed circuit board 38, with 2-axis bevelled tongue 39 at the top, and hole 40 part-way down. The tongue has dimensions at the end of approximately 6 mm by 0.5 mm, and is used to support nine insulated solid wires of number 30 A.W.G. copper. These wires pass through hole 40 twice, having been looped around tongue 39 under tension, and are held in place by cyano-acrylate adhesive (not shown), covered by a thick layer of epoxy (not shown). The wires then are brought out in a group to signal generating means 41, contained in a programmable logic chip (EPLD) which produces clock signals $\phi_1-\phi_9$. One such suitable programmable logic is the EP900 made by Altera Corp of Santa Clara, Calif. This EPLD is a CMOS part, with accurate output voltage levels of 0 V and 5 V. A program listing for this part is given below at the end of this disclosure as Listing 7.

As can be seen in FIG. 13, circuit board 38 has FET buffer 60, to minimize loading of the small signal produced by detector electrode 3. This buffer contains a FET Q1, a bias resistor R5, one end of which is used as detector electrode 3, and a power supply filter capacitor C1. The buffer is interfaced to signal conditioning means 46 through two cables; one marked +8 V for the FET drain, and a coaxial one marked COAX for the signal out ($V_q$), and a ground reference.

Circuit board 38 is mounted so that wires 21-29 crossing the tip of the board are flush with the top surface of metal box 37, and detector electrode 3 is perpendicular to the wires, but parallel to the end of tongue 39 and to the top surface of the box. Metal box 37 acts like a Faraday shield, and helps to localize the sensing to the area just above the radiators and the detector. Rigid mounting of the electrostatic radiators and detector relative to the box is desirable to reduce unwanted signal variations caused by mechanical disturbance of field patterns.

Signal generating means 41 is shown in further detail in FIG. 15. U5 is a clock generator which oscillates at a frequency of 19,200 cycles per second, and directly drives U1, the EPLD.

U1 divides the clock frequency by five, using a counter comprised of bits K0–K2, and then further divides the clock frequency by 256, using a counter comprised of bits C0–C7, where C0 is the most frequently changing of these bits.

The 256 states determined by C0–C7 are divided into eight groups of 32 states each, or 16 cycles of bit C0.

In more detail, FIGS. 14 and 15 show circuitry of signal generating means 41, buffer amplifier 5, and signal conditioning means 46.

The C0–C7 bits are decoded to produce outputs P0–P8 from U1, corresponding to $\phi_1-\phi_9$ respectively.

Each group of 32 states corresponds to the application of bit C0 to one of the $\phi_1-\phi_9$, and of the complement of C0 to the next-higher-indexed clock signal $\phi_1-\phi_9$. In this way, a pair of adjacent clock signals are driven with opposite-phase clock levels, based on bit C0.

CR is an output from the EPLD, provided as a reference clock for signal conditioning means 46.

In FIG. 14, the clock PHI is level-shifted from the 5 V logic levels of clock CR by inverters U4 to 8 V logic levels.

FIG. 14 shows an electrostatic detector electrode E1 corresponding to detector electrode 3 in FIG. 10, and FET buffer Q1 also in FIG. 12 and corresponding to buffer amplifier 5 in FIG. 10. In FIG. 14, reference is made to circuits comprising part of signal conditions means 46. These include amplifier U2A, a synchronous detector comprising in part U1 and U2C and which uses clock PHI, offset removal potentiometers R9–R16 which are selected through analog multiplexer U3 for individual pixel adjustment of signal $V_q$, and potentiometer R4 which with voltage buffer U2B is adjusted to keep the signal $V_q$ within linear signal range.

The output of amplifier U2A is approximately a square wave at the frequency of clock PHI, resulting from the signal at electrostatic detector electrode 3, or E1 in FIG. 14, such signal being a sum of two terms of opposite phase, according to which pair of the clock signals $\phi_1-\phi_9$ are currently driven.

The output of amplifier U2A is level-shifted by capacitor C2 to yield a voltage such that the positive half-cycle of clock PHI corresponds to this voltage being equal to the reference output voltage from buffer amplifier U2B. During several negative half-cycles of clock PHI, this voltage is transferred to capacitor C4, and is further transferred during the positive half-cycles of clock PHI to capacitor C3. The voltage on capacitor C3 is amplified by amplifier U2C.

Diode D1 shifts the output voltage of amplifier U2C towards ground potential by approximately 0.6 V, so that the output signal ANALOGIN has a low output voltage range to approximately ground potential.

After several cycles of clock PHI, the signal at electrostatic detector element E1 is synchronously demodulated, and the output signal ANALOGIN settles to a DC value accordingly.

In FIG. 15, reference is made to circuits comprising part of signal conditioning means 46. Analog to digital conversion of signal ANALOGIN from FIG. 14 is done by half-flash converter U2.

Computer 59 sends a byte serially to start sensor unit 58, which then uses $\phi_1-\phi_9$, two at a time as described above, to obtain data for 8 points in sequence. These are converted to binary form, and transmitted serially to the computer as a sequence of 8 data bytes. The data link to the computer operates at 1200 baud.

Serial interface to the computer is done by U3 and U4. U1 generates signals required to interface converter U2 to the serial link through integrated circuit U3, which comprises a full-duplex serial interface, known as a UART. Level shifting for the computer link is done by U4, which converts between RS 232-C levels required for the serial link and 5 V logic levels required by U3.

The software utilized for signal conversion will now be described with reference to the following program listings, detailed listings for which are set out at the end of this disclosure in the C programming language, version 4.0 of Microsoft C, and including some assembly language, version 3.0 of Microsoft Macroassembler.

LISTING 1: PLP

This listing contains information required to link together the various software modules used, in conjunction with sensor unit 58, to obtain the images of FIGS. 16 and 17.

LISTING 2: CMND.C

This listing contains the main program, which sets up global constants, memory allocation, and selects graphics mode. In addition, it displays on the screen a menu from which the operator selects various functions, such as autozero (F1 key), set inter-scan-line step size on the display (F5), set interpolation constant "k" (F6), acquire data (F7), save data buffer to disk file (F8), load disk file to data buffer and display data on the screen (F9), and exit from program (F10).

The "autozero_signal" removes DC offsets from the input data, first calling "acquire" to obtain raw data in a buffer, and then calling "autozero".

The "change_step" accepts a new constant, from the operator, for the vertical separation required between successive scan lines displayed.

The "change_k" accepts a new constant k, from the operator, used during the pixel interpolation process. The value of k determines the overshoot and frequency response of the interpolation, which are inter-related. This constant is determined empirically, by selecting the k value yielding the best-looking display.

The "acquire_signal" polls the sensor unit for new data, and then displays the data. It calls "acquire" to obtain new data, "decimt" reduces the amount of data by accepting only one scan line of data per "D_RATIO" scan lines, "offset_removal" makes use of the error values obtained by "autozero" to yield signals with little DC offset, "mean_of" finds the average value of the elements of the buffer and this value is assigned to the variable "dc", "dc_removal" is used to ensure that when the signals are subsequently integrated they have the same end-points, "flip" reverses the polarity of the signal to be displayed so that more positive values will appear towards the top of the screen, "display_signal" does interpolation to give more points for the display and does filtering to smooth the traces and integrates the signals and then puts the output to the screen, "crt_curpos" and "printf" are used to display the constant "dc" on the screen.

The "save_signal" calls "savebuf" to write the data buffer to a disk file.

The "load_signal" calls "savebuf" to load the data buffer from a disk file.

The "display_signal" calls "prof_format" which converts the data in "buff" to a 2-D array "prof1", "prof1_prof2" interpolates and integrates the data in the "prof1" array, and puts the result to "prof2", "prof1_prof3" is similar but integrates first and then interpolates to put results in "prof3", "disp_profile" is called four times to give four different displays, namely the raw data, then two displays with steps shown between points, and finally a display with a smooth transition from one point to another using line interpolation. All four displays are shown on the screen at one time.

The "prof_format", "prof1_prof2", "prof1_prof3", and "disp_profile" have been outlined above.

LISTING 3: DISPLAY.C

These subroutines are called by "display_profile".

The "drawscan" outputs points to the EGA screen according to an array of X-Y points provided.

The "integrate" performs a discrete integration, or summation, over the input points.

The "intp_flat" interpolates between points to provide new points to be displayed. This routine then interpolates again to yield steps on the display between the interpolated points. Note that two levels of interpolation are used here. The first level obtains extra points between pairs of the input points. The second level extends the first-level interpolated points sideways on the screen until a stair-case pattern is seen.

The "intp_line" is similar to "intp_flat", but in addition use line interpolation between the previously-interpolated points. This second level of interpolation fills in between the first-level interpolated points, by joining them on the screen using straight lines.

The "intp_fltr" is similar to "intp_line", but instead of line interpolation uses a low-pass filter for the second level of interpolation, resulting in a smoother display.

The "interp_flat" uses "intp_flat", and is called by "display_profile". "interp_flat" sets up variables for "intp_flat", and calls in once per scan line of data to be displayed.

The "interp_line" uses "intp_line" in a similar way. The "interp_filter" uses "intp_filter" in a similar way. Other routines in listing 3 set up the EGA graphics mode, and return to the normal mode.

LISTING 4: STORAGE.C

The "savebuf" writes the data buffer to a disk file.

The "loadbuff reads the data buffer from a disk file.

The "getfile" opens a file specified by the operator, for read or write of a data buffer.

The "no_echo_gets" reads a character string typed by the operator, without echoing a carriage return.

The "printbottom" outputs a character string to line 24 on the screen.

The "noechogetint" reads an integer typed by the operator, without echoing a carriage return.

LISTING 5: ACQUIRE.C

The "acquire" obtains new data from sensor unit 58. Serial port COM2 of computer 59 is used, with a data rate of 1200 baud. To request data for one scan line from sensor unit 58, a byte is sent by computer 59 to port COM2. Thereupon, eight bytes from sensor unit 58 are read sequentially from COM2. This process is continued for several scan lines, equal in number to the variable "points".

The "autozero" determines average values for each pixel element across the "points" scan lines in the buffer. These average values are found when no object 19 to be sensed is located near the sensor, and therefore represent error signals which are referred to as pixel offsets, and are stored for use by "offset_removal".

The "offset_removal" takes the pixel offsets found by "autozero", and subtracts them from the scan line data in the data buffer. Thus, the pixel errors are removed from all scan lines used for later display.

The "dc_removal" is used to force the right ends of the integrated scan line data to have the value zero, the left ends being at zero automatically insofar as they precede the summation of the first actual data point. This is done by adding a DC value to the scan line data before integration. This procedure is appropriate for the plastic package seals, where it is known that the two ends of each scan must have the same value, and it is desirable to obtain a display with uniform end-points.

The "flip", "mean_of", and "decimt" have been outlined above.

LISTING 6: CONSOLASM

This contains assembly-language subroutines for use with the screen and keyboard.

The "ega_draw_pix" outputs a dot on the EGA screen, at specified coordinates x,y, where these values are scaled such that an increment of one corresponds to a shift of one pixel on the screen.

The "crt_setcurpos" moves the cursor, used for character screen writing, to coordinates x,y, where these values are scaled such that an increment of one corresponds to a shift of one character on the screen.

The "crt_cls" clears the screen except for the bottom line.

The "command" reads an undecoded key directly from the keyboard.

Other Configurations

FIGS. 18-21 show several sensor configurations using two electrostatic radiators 1, 2, and one electrostatic detector 3, producing output voltage $V_q$ via amplifier 5.

Figure 18:
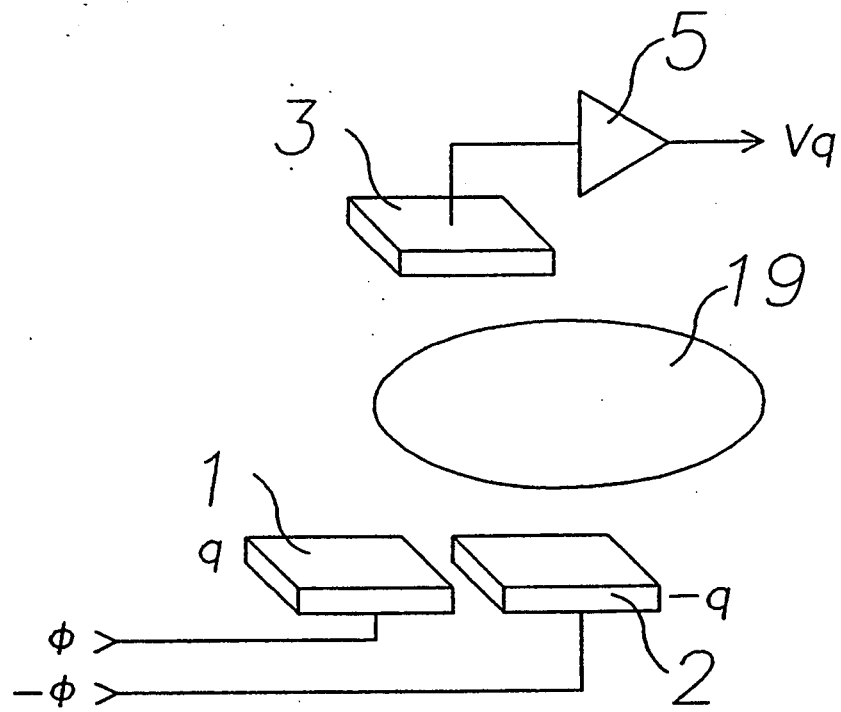
FIG. 18 shows a sensor configuration with a pair of co-planar electrostatic radiators and a normally displaced electrostatic detector, with an object positioned nearby (in the region between the radiators and detector).

In FIG. 18, two electrostatic radiators 1,2 are co-planar, and electrostatic detector electrode 3 is located above radiators 1,2, and object 19 is placed between the detector electrode and the radiators.

Figure 19:
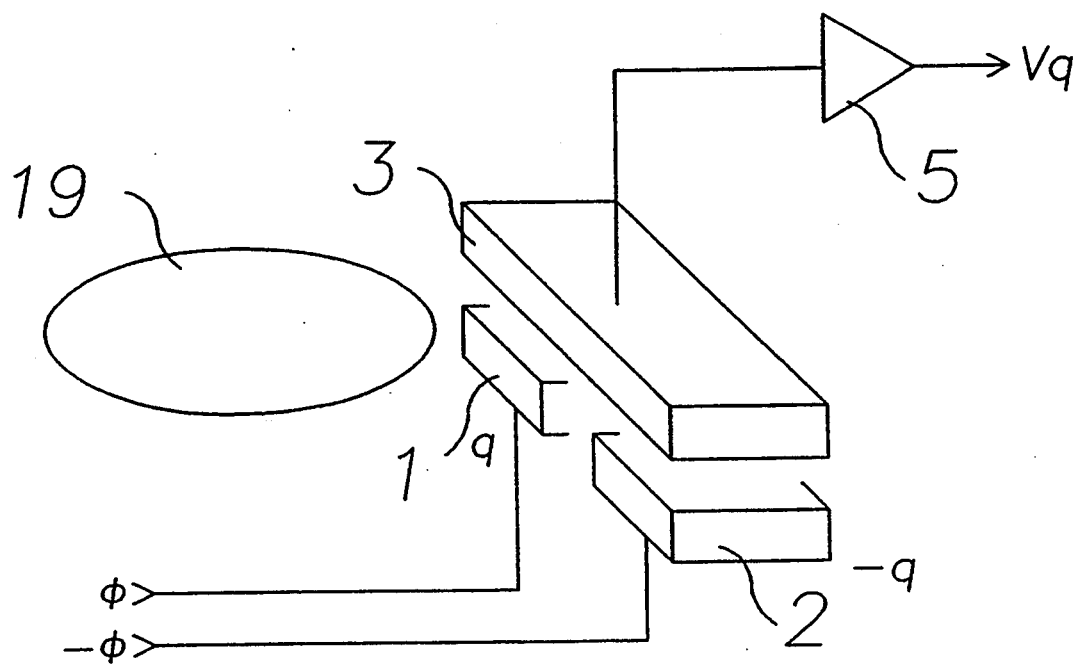
FIG. 19 shows a sensor configuration with a pair of co-planar electrostatic radiators and a normally displaced electrostatic detector, with an object positioned nearby (in the region adjacent to the radiators and detector).

In FIG. 19, electrostatic detector electrode 3 is located above the electrostatic radiators 1, 2 but nearby, and object 19 its perturbs of the electrostatic field patterns at the edge of the radiators 1,2.

Figure 20:
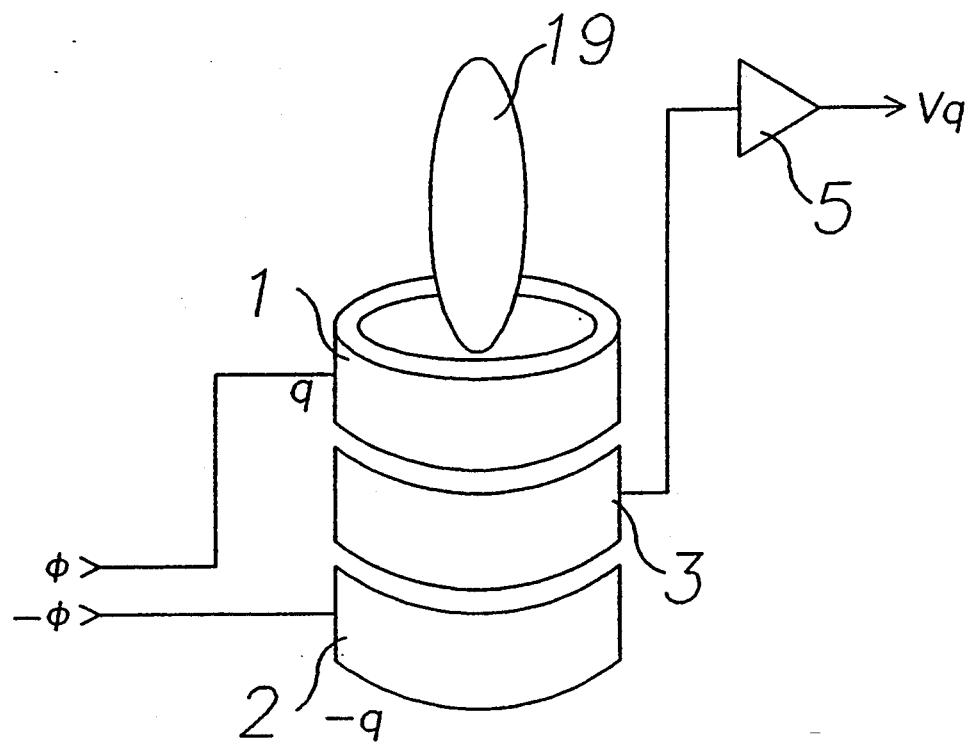
FIG. 20 shows a sensor configuration with electrostatic radiators and an electrostatic detector comprised of a sequence of conducting cylinders.

In FIG. 20, electrostatic radiators 1,2 and electrostatic detector electrode 3 are coaxial, and object 19 is placed inside.

Figure 21:
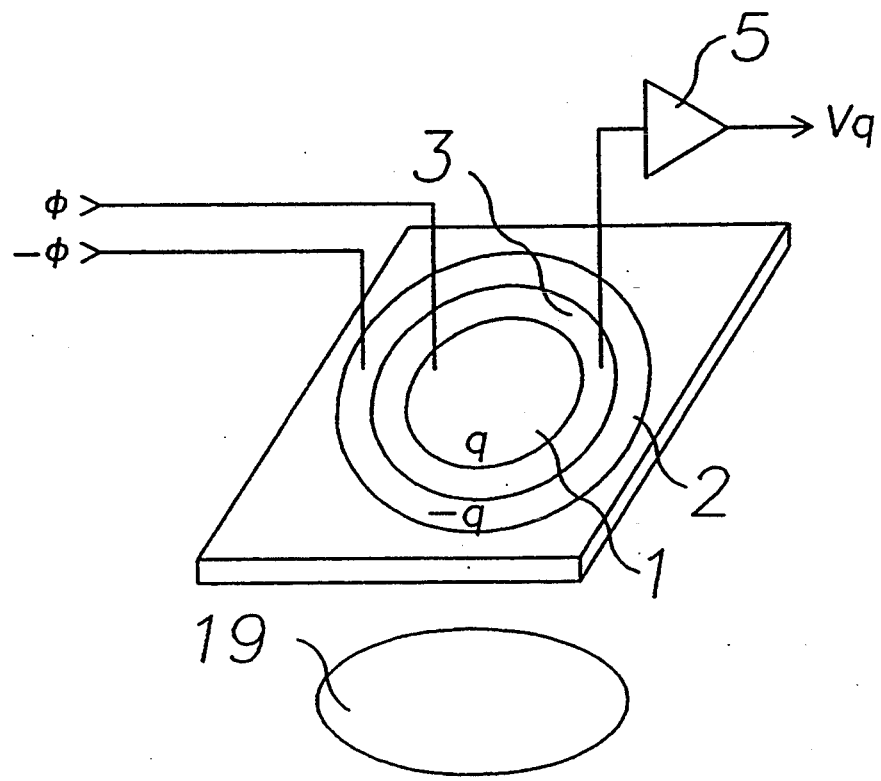
FIG. 21 shows a sensor configuration with electrostatic radiators and an electrostatic detector comprised of co-planar conducting rings.

In FIG. 21, the electrostatic radiators and electrostatic detector electrode are successive co-planar rings with detector 3 located between inner and outer radiators 1,2. Objects 19 is located above or below the plane.

Figure 22:
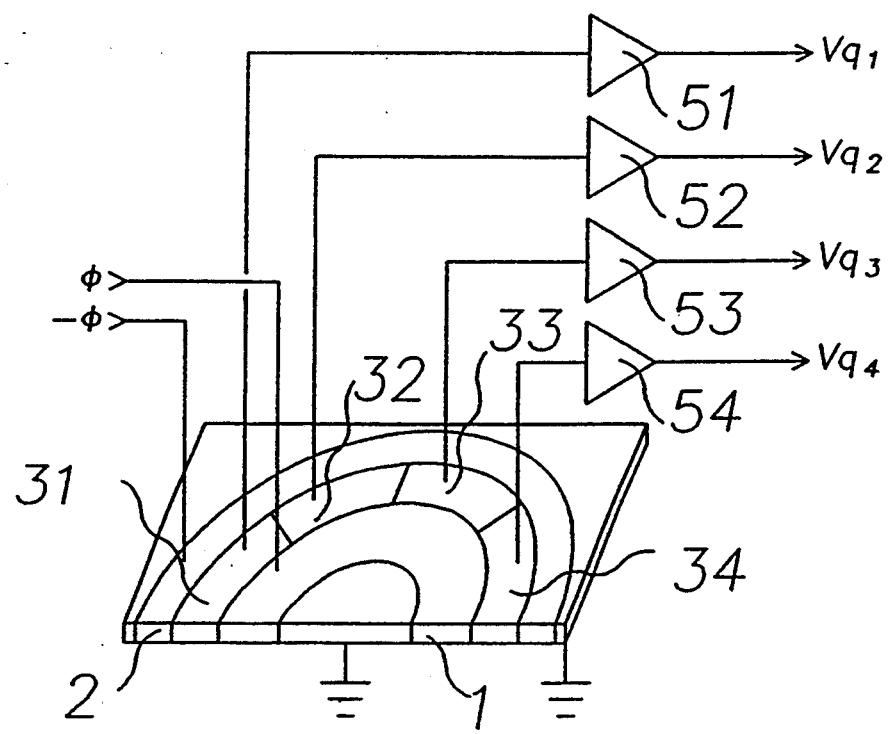
FIG. 22 shows a sensor configuration with a pair of electrostatic radiators and several electrostatic detectors.

FIG. 22 shows a sensor configuration using two electrostatic radiators 1,2, electrostatic detector electrodes 31,32,33,34 and associated buffer amplifiers 51,52,53, 54. This sensor configuration is capable of extracting one pixel of information per detector electrode, when inspecting a stationary object. FIG. 22 shows only one of many possible geometries in accordance with the present invention.

Figure 23:
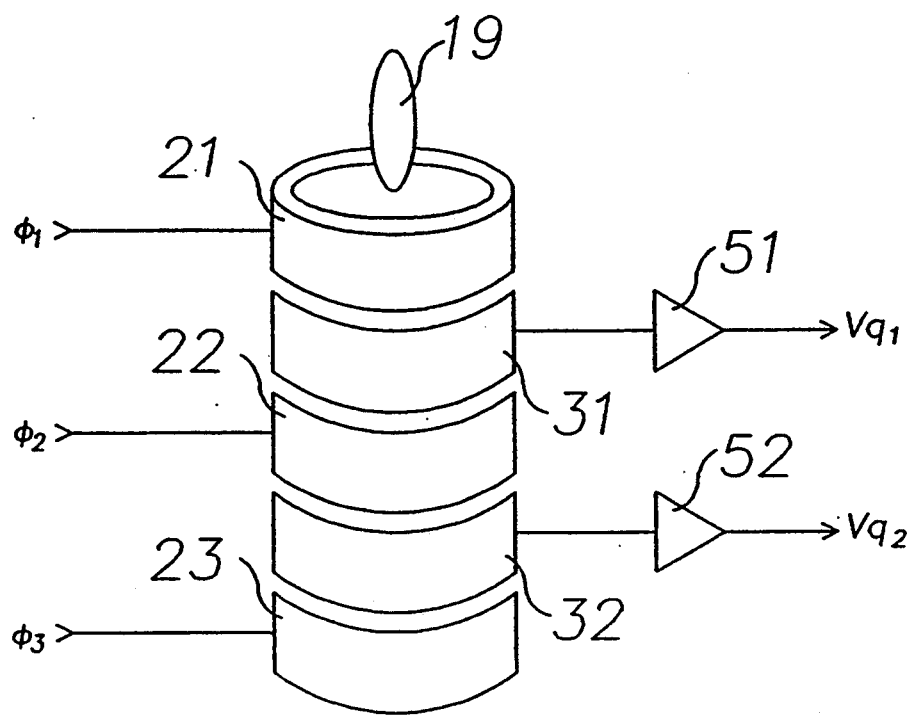
FIG. 23 shows a sensor configuration with several cylindrical electrostatic radiators and electrostatic detectors.

FIG. 23 shows a sensor configuration using several electrostatic radiators 21, 22, 23 and two electrostatic detector electrodes 31,32. This sensor configuration is capable of extracting one pixel of information per detecting electrode, when inspecting a stationary object. FIG. 23 shows only one possible geometry in accordance with the present invention.

Mechanical scanning methods may be used to obtain pixel values in one or more additional directions. For example, the line-scan sensor configuration in FIG. 10 produces information about object 19 in the u direction. But relative motion in the v direction, of such a line-scan sensor configuration, yields a U-V array of data points. These points correspond to the quasi-gradient component parallel to the electrode axis.

Figure 24:
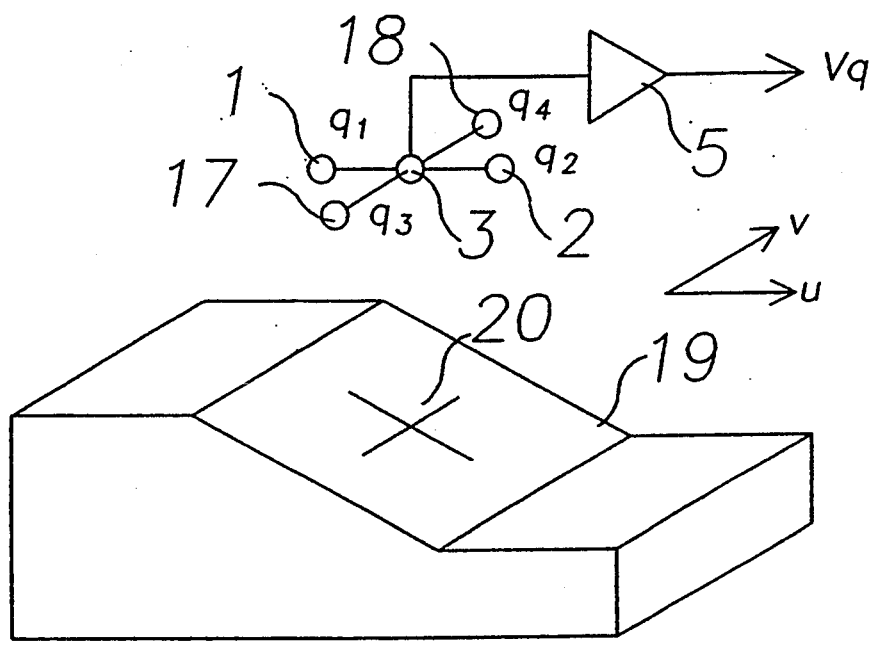
FIG. 24 is a conceptual diagram of a sensor configuration used to determine the quasi-gradient at a single point of an object located nearby.

FIG. 24 shows a conceptual view of a sensor configuration capable of extracting an approximation to the surface gradient of a face of object 19. This approximation to the surface gradient is referred to as the quasi-gradient, with respect to vectors u and v. In a scale drawing, the surface would be shown closer to the electrostatic radiators and detector. In this sensor configuration, charges $q_1$ and $q_2$ are used to extract the u term, and $q_3$ and $q_4$ the v term, respectively. Only one pair of the orthogonally placed charges 1 and 2, or 17 and 18, may be non-zero at a time. In FIG. 24, point 20, centered directly beneath electrostatic detector electrode 3, is the point about which information is being gathered.

By suitable scanning means, a quasi-gradient array may be obtained. From this, the surface may be calculated in a manner similar to that described in FIG. 8, by nonlinearly integrating the projection of the quasi-gradient along the line of the vector along which a cross-sectional surface profile is to be generated. A series of surface profiles can thus be generated, and then combined for a full 3-D map. A quasi-gradient projection along a line is calculated using a dot product, as is done in the calculation of a gradient projection along a line, which yields a slope.

Figure 25:
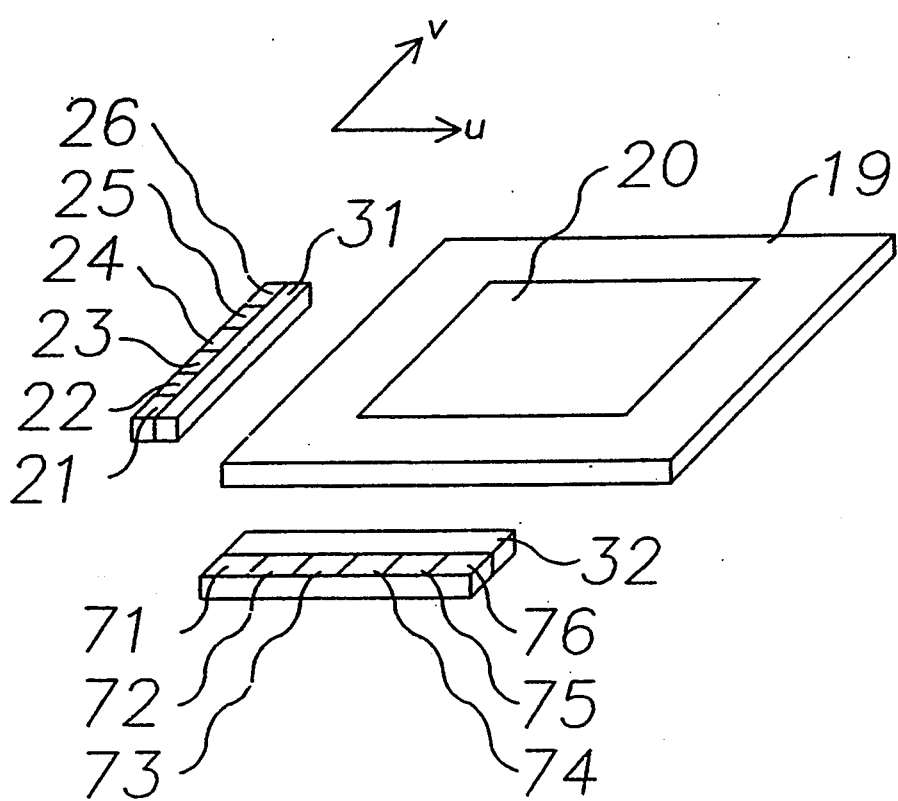
FIG. 25 shows a sensor configuration with two sensors of the type shown in FIG. 10.

FIG. 25 shows one method of obtaining the quasi-gradient array, from which surface profiles may be constructed. A sensor configuration with electrostatic radiators 21,22,23,24,25,26, and electrostatic detector electrode 31 as in the sensor configuration in FIG. 10 is mechanically moved past the object 19 in the u direction, and a second sensor configuration with electrostatic radiators 71,72,73,74,75,76, and electrostatic detector electrode 32 is mechanically moved past the object in the v direction. Data from the two sensor configurations are combined to produce quasi-gradient vectors with u and v components. In FIG. 25, scanned part 20 of the surface of object 19 is shown, and an image may be constructed for this scanned part 20.

Figure 26:
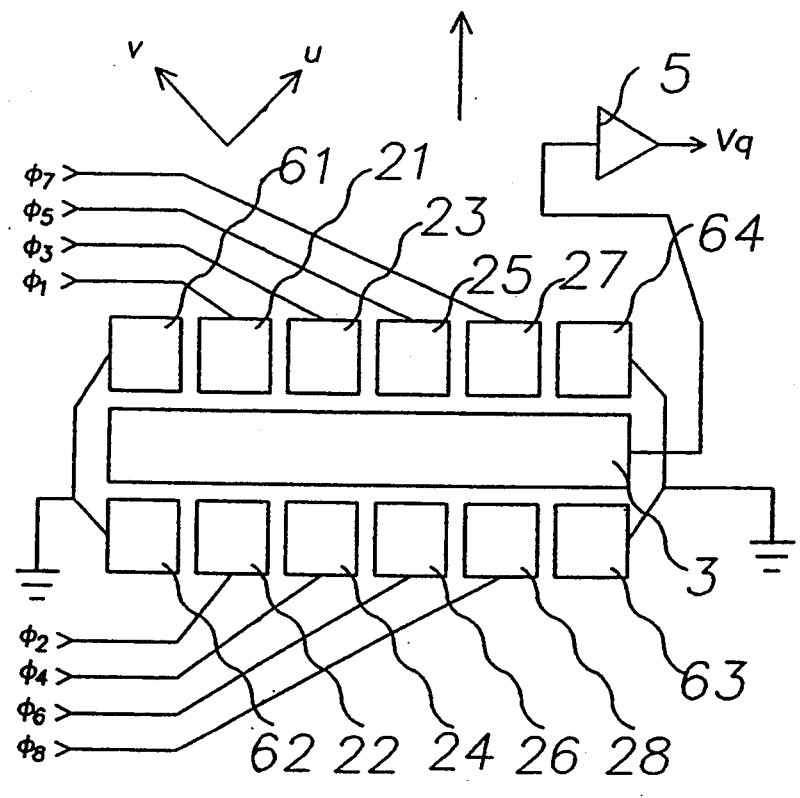
FIG. 26 shows another sensor configuration with several electrostatic radiators and one electrostatic detector.

FIG. 26 shows a section of a sensor configuration with electrostatic radiators 21,22, 23,24, 25,26,27,28, electrostatic detector electrode 3 and buffer amplifier 5, used to obtain both the u and v components when the external object (not shown) is moved past the sensor configuration in the u+v direction. Pairs of electrostatic radiators are selected for drive with opposite-phase clock signals as in FIG. 10. For example, the pair $\phi_5$ and $\phi_2$ when so driven will yield a u component, and the pair $\phi_6$ and $\phi_1$ when so driven will yield a v component, with u and v as shown in FIG. 26. The u and v axes are tilted at 45° to the direction of mechanical movement. Ground electrodes 61,62,63,64 serve to control effects at the sensor ends, making the response for selected radiator pairs more uniform across the array than if the end electrodes were electrostatic radiators driven by signal generating means 41.

Figure 27:
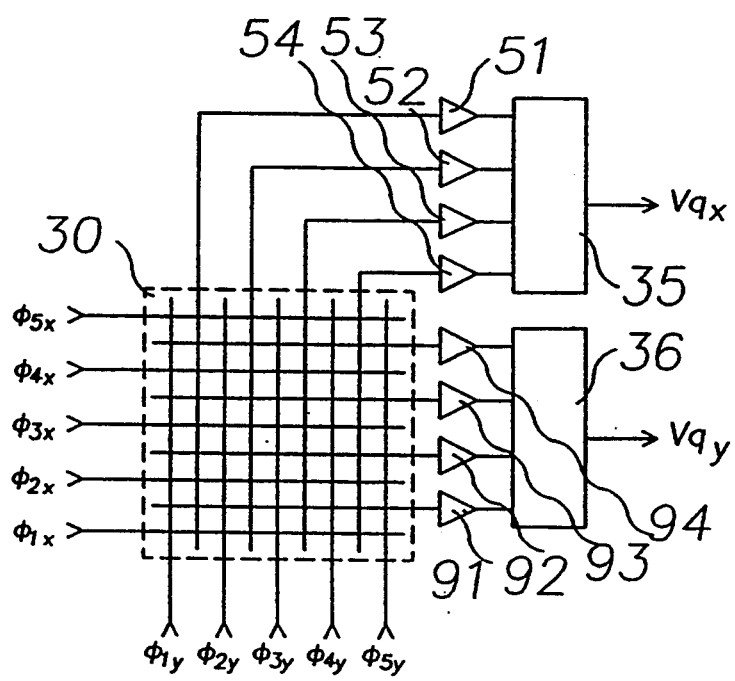
FIG. 27 is a further sensor configuration with an X-Y grid of electrostatic radiators and electrostatic detectors.

FIG. 27 is a conceptual view of X-Y sensor configuration 30, capable of individual pixel determination of quasi-gradients. It can be seen as an extension of the two line scan sensor configurations in FIG. 25 to cover all pixels at once, with electronic scanning of the array, and therefore not requiring the mechanical scanning of FIG. 25. The axes are scanned sequentially rather than simultaneously, for the u and v components, to produce a quasi-gradient map. FIG. 27 shows the various electrostatic detector electrodes connected to amplifiers 91 through 94 and 51 through 54. The four amplifiers 91 through 94 are connected to analog multiplexer 36 which provides an output signal $V_{qy}$ about the quasi-gradient in the Y direction. Similarly, analog multiplexer 35 provides an output signal $V_{qx}$ quasi-gradient in the X direction.

Figure 28:
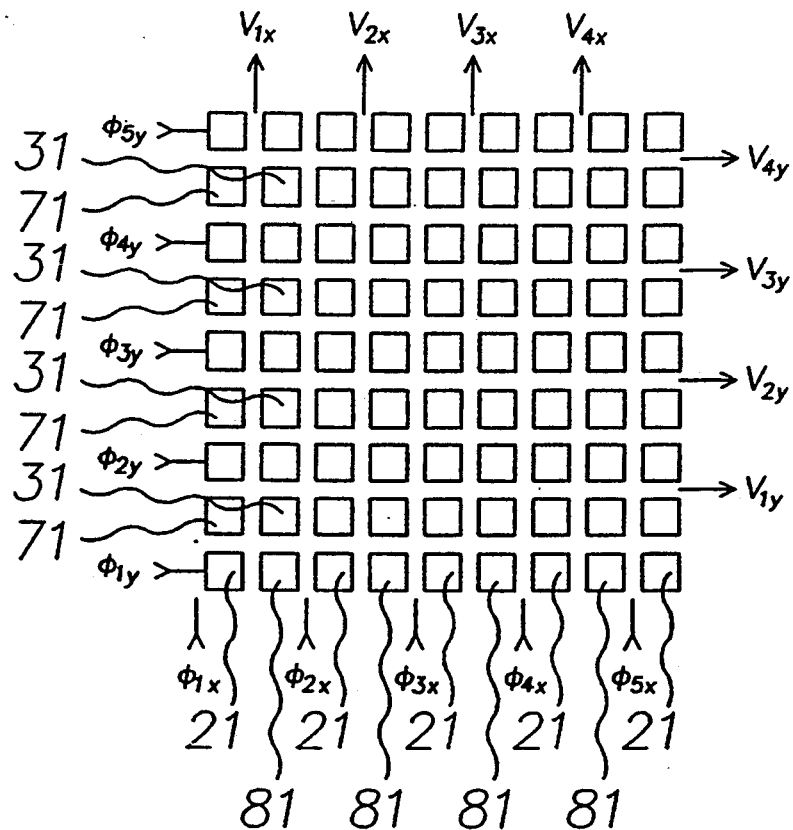
FIG. 28 shows the electrode pattern of the sensor configuration shown in FIG. 27.

FIG. 28 shows an X-Y sensor configuration similar to that in FIG. 27. A two-sided printed circuit board is used, with all electrostatic radiators and detectors located on one side, along with some of the interconnections, and with the remaining interconnections located on the other side. The electrostatic radiators and detector electrodes are connected as shown in FIG. 29.

Figure 29:
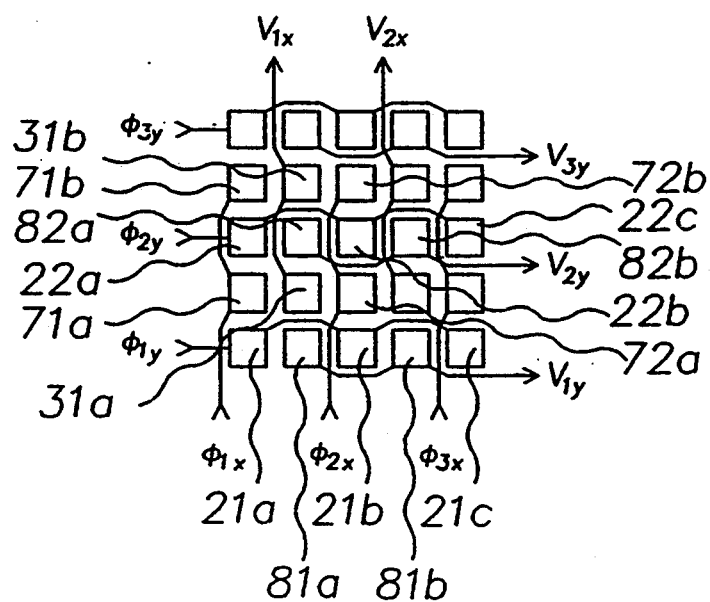
FIG. 29 shows in more detail the connections made between the electrodes in FIG. 28.

FIG. 29 is part of an X-Y sensor configuration as shown in FIG. 28. It has a symmetric structure to avoid imbalance in the signal coupling to the electrostatic detector electrodes. Each electrostatic detector electrode has equal capacitive pickup from each pair of electrostatic radiators, when no external object is applied. Clock signal $\phi_{1y}$ drives electrostatic radiators 21a,21b,21c which are equally spaced in the X direction, and clock signal $\phi_{2y}$ drives radiators 22a,22b,22c also equally spaced in the X direction. Similarly spaced radiators are driven in the Y direction, where clock signal $\phi_{1x}$ drives radiators 71a,71b, and clock signal $\phi_{2x}$ drives radiators 72a,72b. Other radiators in the array are driven in a similar manner.

The electrostatic detector electrodes are distributed regularly in the array. Detector electrodes 81a and 81b provide output signal $V_{1y}$, and detector electrodes 82a and 82b provide output signal $V_{2y}$, which are equally spaced in the X direction. Similarly spaced detector electrodes are located in the Y direction, such as detector electrodes 31a and 31b which produce output signal $V_{1x}$.

Figure 30:
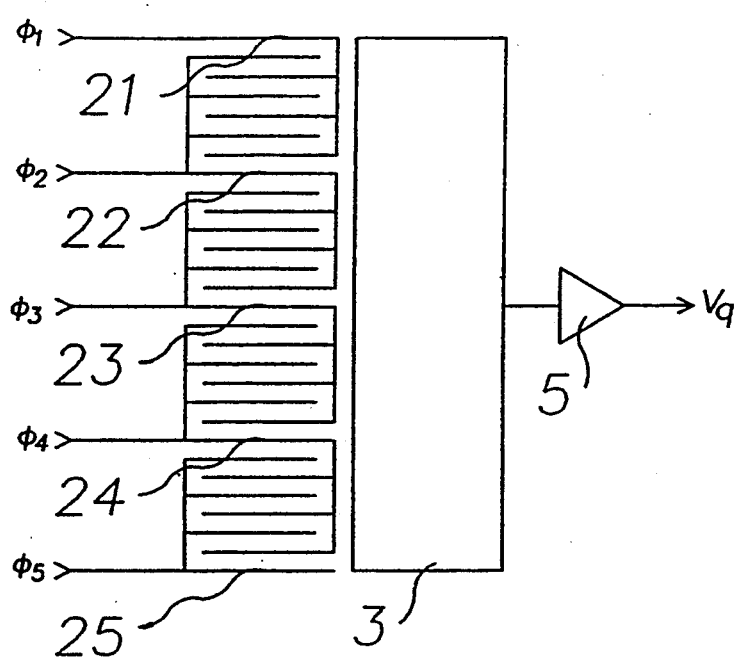
FIG. 30 shows a sensor configuration with several electrostatic radiators and one electrostatic detector, in which the radiating electrodes have interleaved fingers.

FIG. 30 shows a sensor configuration, similar to that of FIG. 10, but with electrostatic radiators 21-25 being formed with interleaved fingers. This serves to largely cancel the output signal $V_q$ where two adjacent electrostatic radiators are driven in opposite phase, because the near-field pattern produced is reduced nearly to zero at the location of the object to be sensed (not shown). The interleaved fingers result in a fast-diminishing field with height when the fingers are differentially driven, but a slowly-diminishing field with height when the fingers are driven in phase. Therefore, it can be arranged that only when there are two adjacent sets of interleaved fingers driven in phase will there be a detectable signal. This capability to produce three states, namely an almost null phase and two opposite phases where each is comprised of two sets of fingers in sequence, serves to reduce the complexity of clock signal generation to one bit per radiator, rather than two bits as required by the sensor configuration in FIG. 10, which requires for each radiator a separately-determined off-state in addition. In FIG. 30 are shown electrostatic detector electrode 3 and buffer amplifier 5. The sensed object (not shown) is kept at a sufficient distance from the electrostatic radiators and detector electrode that the near field caused by oppositely-driven adjacent electrodes is negligible. This reduction in the complexity of circuitry for signal generating means 41 is useful for sensor configurations with many radiators.

Other fixed-geometry radiator patterns may be designed for different spatial decay functions.

Figure 31:
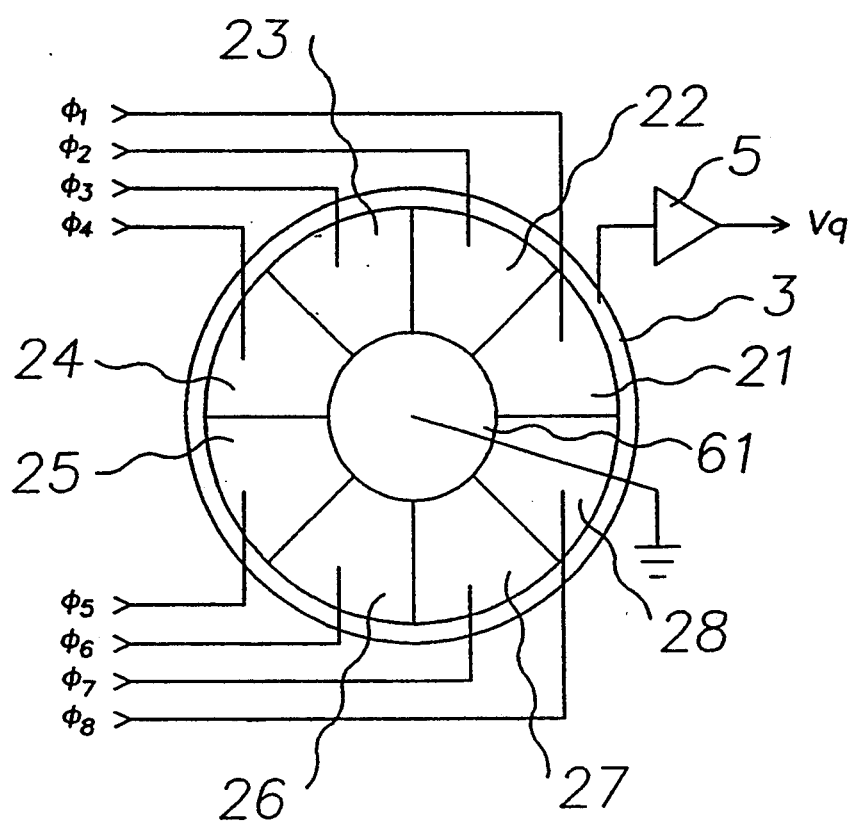
FIG. 31 shows a sensor configuration with several electrostatic radiators and one electrostatic detector, in a sensor with programmable geometry.

FIG. 31 shows a sensor configuration using many electrostatic radiators 21-28 and one electrostatic detector electrode 3, wherein the electrostatic field shape and amplitude decay as a function of distance are programmed according to which radiators are driven. More distant electrostatic field patterns occur when opposite radiator pairs are activated than when are adjacent pairs. This has the effect of making the sensor configuration dynamically adjustable in terms of useful range. Opposite pairs can give guidance information in a vision application, and adjacent pairs can give more shape information around the ring. In this sensor configuration, the shape information consists of 8 pixels. This permits distance and resolution to be optimized. In FIG. 31 the central electrode 61 is connected to ground. FIG. 31 shows only one of many possible geometries in accordance with the present invention.

Figure 32:
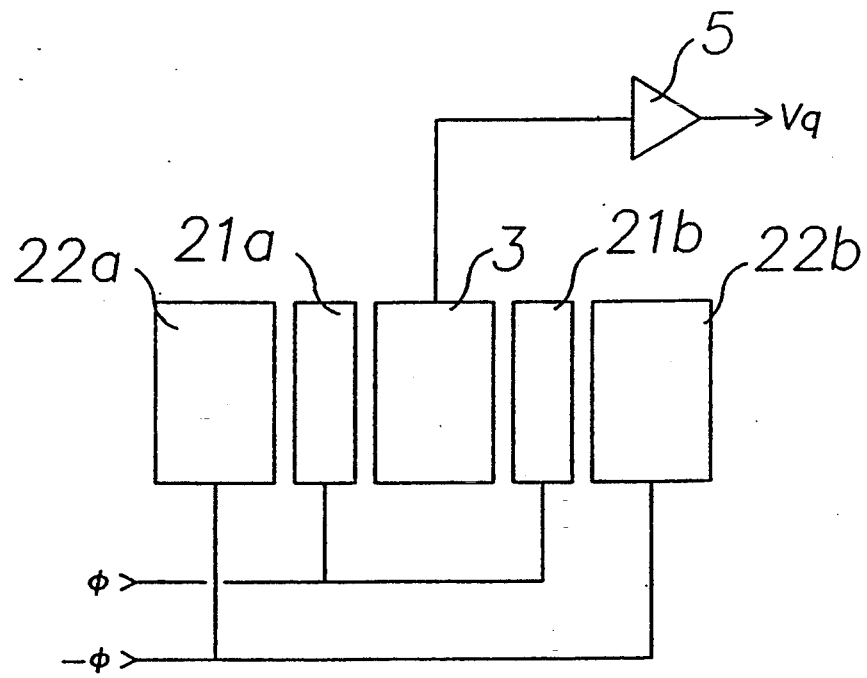
FIG. 32 shows a sensor configuration with several electrostatic radiators and one electrostatic detector, in a sensor for measurement of distance.

FIG. 32 shows a sensor configuration using electrostatic radiators 21 and 22 and electrostatic detector electrode 3, wherein the radiating field geometry is different for each of the clock signals $\phi_1$ and $\phi_2$, with the result that the signal attenuation versus distance for the clock signals is different. The sensor configuration has a response which is a function of distance to the object (not shown), and can be used to determine distance when calibrated for known objects.

Figure 33:
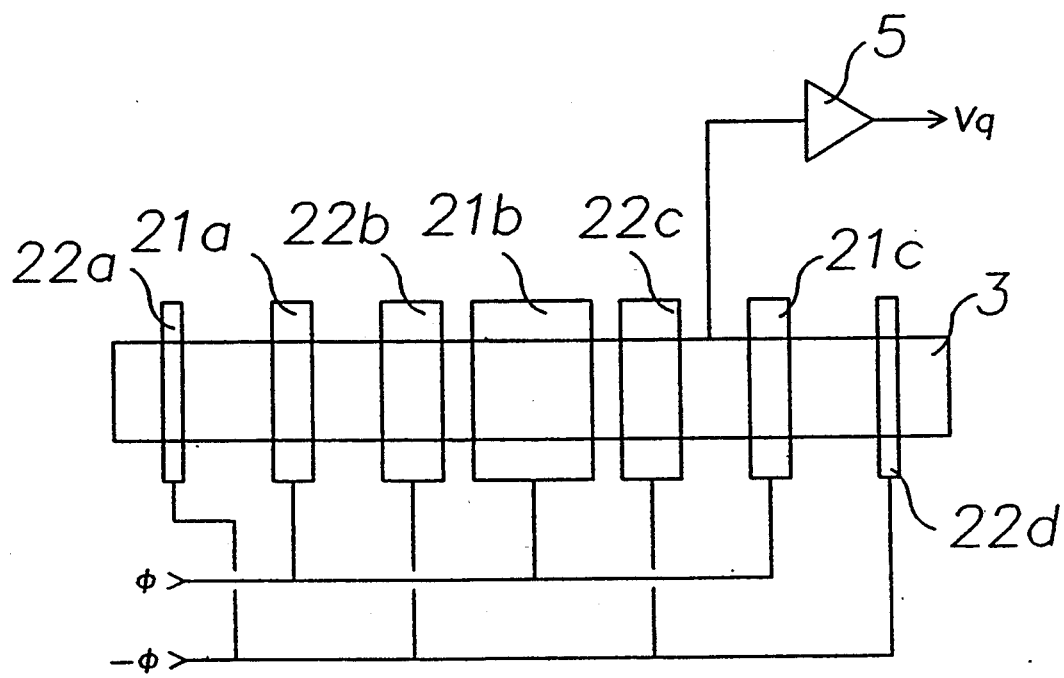
FIG. 33 shows a sensor configuration with several electrostatic radiators and one electrostatic detector, in a sensor with the field peaking relatively sharply along a center line.

FIG. 33 shows a sensor configuration using electrostatic radiators 21a,21b,21c ,22a, 22b,22c ,22d and electrostatic detector electrode 3, wherein the electrostatic field shape is controlled to produce a response which peaks along the center line. Two clock signals are used, with interdigitated radiators of empirically optimized geometries. Similar sensor configurations may be constructed using more clock signals.

Figure 34:
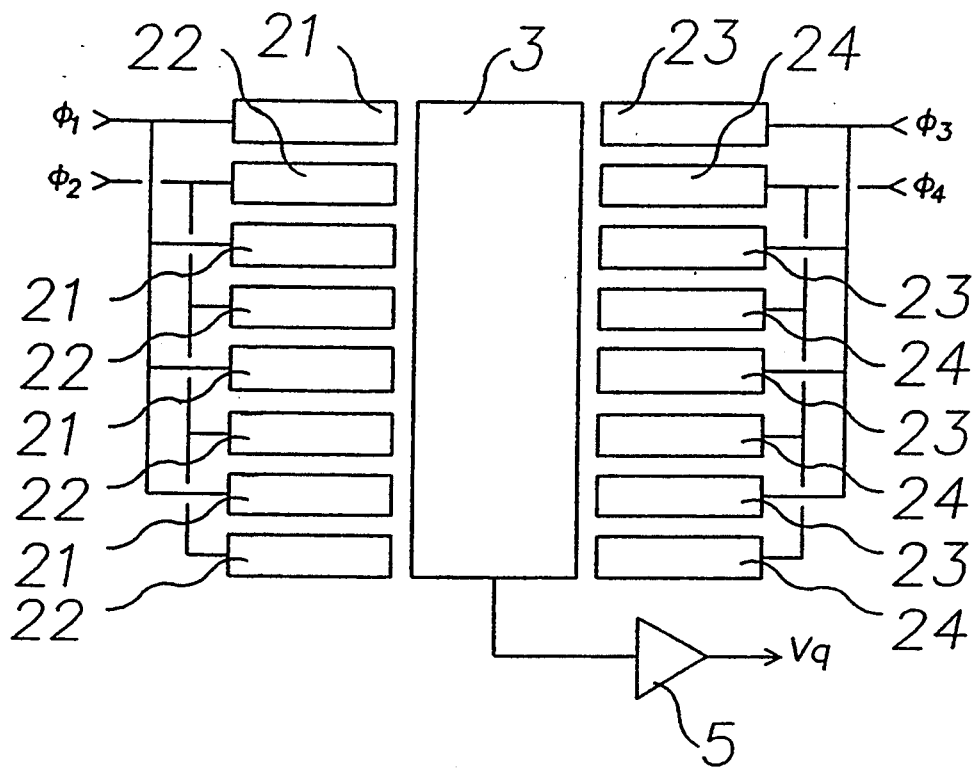
FIG. 34 shows a sensor configuration with two rows of electrostatic radiators, and one electrostatic detector, for measuring depth of ridges in a metal surface.

FIG. 34 shows a sensor configuration comprising two parallel rows of interdigitated pairs of electrostatic radiators 21, 22 and 23, 24, with electrostatic radiator 3 located between the rows.

This sensor configuration may for example be used to obtain an average value for the depth of grooves on the surface of a metal object. For an object such as a cylinder with uniform grooves around its circumference, for example a can used for food or beverages, the repeating pattern of the rows of radiators is aligned with these grooves, such that in each row the interdigitated pairs of electrostatic radiators have one set of radiators near the peaks, and one set of radiators near the valleys, determined with reference to the grooves. This results in an asymmetry, and therefore in a detectable signal output $V_q$, which is related to the depth of the grooves according to a non-linear function. This function can be empirically determined, and sensor configuration output $V_q$ can then be compensated, resulting in a measurement of the depth of the grooves, averaged over all grooves near the electrostatic radiators and detector.

Measurement of the depth of the grooves requires that the object to be sensed (not shown) be centered detector electrode 3. To detect this, the pairs of clock signals $\phi_1,\phi_2$ and $\phi_3,\phi_4$, are driven with the same polarity for each clock in the pair but with the pairs themselves having opposite clock polarity, resulting in a temporary sensor configuration such as that in FIG. 2. In this mode, the detector will produce a signal when the cylinder is nearby, but not centered on detector electrode 3. The cylinder is assumed to be passing by the sensor configuration. When the output signal $V_q$ crosses zero, the external object is at that time approximately centered. When it is centered, the sensor mode is changed to permit measurement of groove depth.

Figure 35:
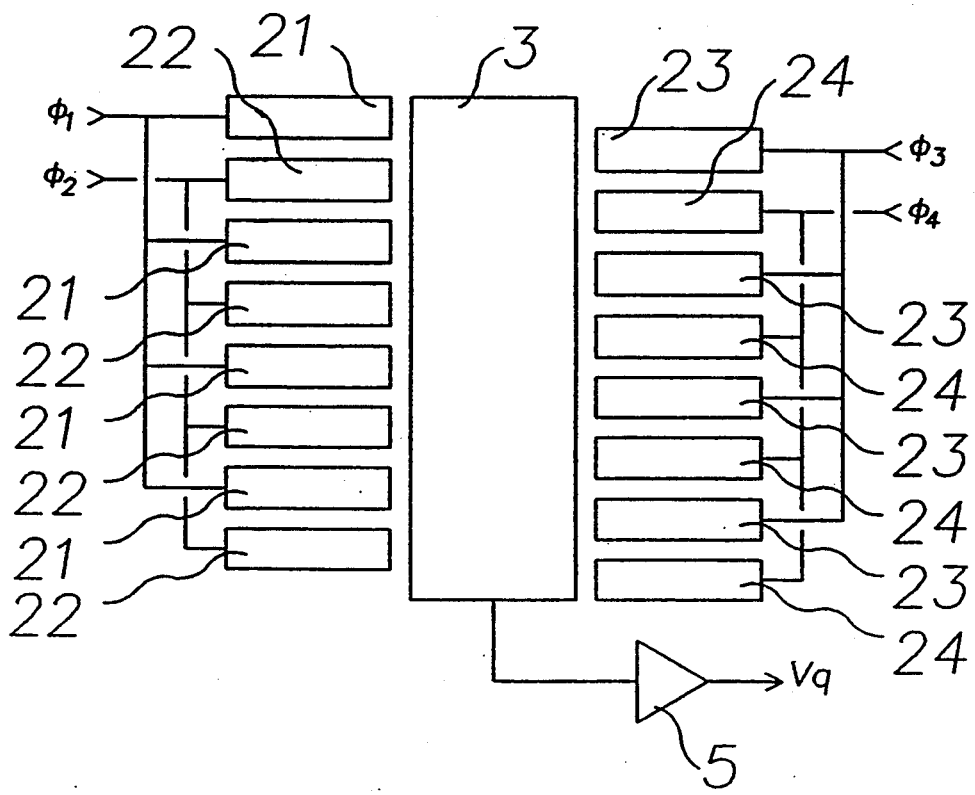
FIG. 35 shows a sensor configuration similar to that in FIG. 34, but with the second row of electrostatic radiators offset by one half space.

FIG. 35 shows a sensor configuration comprising two parallel rows of interdigitated pairs of electrostatic radiators 21, 22 and 23, 24 with electrostatic detector electrode 3 located between the rows. Operation is similar to the sensor configuration in FIG. 34. However, the rows are offset by one half the inter-radiator spacing, to produce contributions to the electrostatic field which overlap. The overlap of these fields permits an approximate determination of the relative vertical position of the radiators and, for example, a cylinder with grooves (not shown). The vertical position is not determined uniquely in terms of integer multiples of groove height. As an example of approximate height determination, the signals from the two rows of radiators can be analyzed in terms of phase quadrature to each other. The phase angle is then used to assist in the compensation of the sensor. This compensation may be done based on empirically determined data. The calculation of phase angle is not accurate, due to the non-linear nature of the component signals involved. However, this may be unimportant when the phase angle is used only as a signal used to weight the contributions of the two rows of radiators in the final groove depth calculations.

Electrostatic radiator and electrostatic detector electrode geometry can have significant effects on the signal produced, and may require optimization for a particular application. Those shown are in accordance with the present invention, but do not limit its scope.

LISTING 1: PLP

```
# filename:       plp
# programmer:
# date:

# make file for building the        Imaging System
# subdirectory ZZ used for object files
# subdirectory DAT used for data files
# msc: Microsoft C version 4.0 or later
# masm: Microsoft macro assembler version 3.0 or later
link: Microsoft linker version 4.0 or later zz\cmnd.obj:   cmnd.c
     msc  cmnd, zz\cmnd;

zz\display.obj: display.c
     msc  display, zz\display;

zz\storage.obj: storage.c
     msc  storage, zz\storage;

zz\acquire.obj: acquire.c
     msc  acquire, zz\acquire;

zz\consol.obj: consol.asm
     masm consol, zz\consol;

plp.exe:  zz\cmnd.obj zz\display.obj zz\storage.obj
          zz\acquire.obj zz\consol.obj
     link zz\cmnd zz\display zz\storage zz\acquire
          zz\consol, plp;
```

LISTING 2: CMND.C

```
#include <stdio.h>

/* global constants */
#define POINTS      30
/* no. of samples in time */
#define D_RATIO     25
/* decimation ratio */
#define AUTOSIZE    2500
/* buffer size for autozero */
#define CHANNELS    8
/* no. of sensors - 1 */
#define XINTP       16
/* x size of profile */
#define XORIG1      0
/* first column x origin */
define XORIG2      160 main()
{
memory_allocation();
graph_mode();

printf("\n\t    FUNCTION MENU:   \n");
printf("\n\t    F1: Autozero the hardware");
printf("\n\t    F5: Change display step and display the signal");
printf("\n\t    F6: Change k and display the signal");
printf("\n\t    F7: Acquire signal from the sensor and display");
printf("\n\t    F8: Save the signal to disk");
printf("\n\t    F9: Load the signal from disk and display");
printf("\n\t    F0: Exit the program\n");
```

LISTING 2: CONTINUED

```c
/* second column x origin */
#define XORIG3        320
/* third column x origin */
#define XORIG4        480
/* fourth column x origin */
#define YORIG         335
/* display y origin */

/* keyboard scan codes */
#define F1   59
#define F5   63
#define F6   64
#define F7   65
#define F8   66
#define F9   67
define F10  68 int *buf;        /* buffer after decimation */
int *buff;       /* buffer before decimation */
int *error;      /* holds autozero error */
int **prof1, **prof2, **prof3; /* hold profiles */
int *disp_tmp;
int *intp_tmp;
int *intg_tmp;   /* temporary working areas */
int points = POINTS;
int xch = CHANNELS;
int xintp = XINTP;
int kintp = 6;
/* interpolation factor, default k = 0.4 */
int disp_step = 10;

command();
  acquire(buff, AUTOSIZE, xch);
  autozero(buff, error, AUTOSIZE, xch);
  printbottom("Autozero done");
} /* autozero_signal */ change_step()  /* changes display y step */
{
  disp_step = noechogetint("Enter new display step
  (10-60) >");
  if( disp_step < 10 ) disp_step = 10;
  else if( disp_step > 60 ) disp_step = 60;
  display_signal();
} /* change_step */ change_k()    /* changes interpolation factor */
{
  kintp = noechogetint("Enter new k (0-15) >");
  if( kintp < 0 ) kintp = 0;
  else if( kintp > 15 ) kintp = 15;
  display_signal();
} /* change_k */ while(1)
    switch( command() )
    {
      case F1:
          autozero_signal();
          break;
      case F5:
          change_step();
          break;
      case F6:
          change_k();
          break;
      case F7:
          acquire_signal();
          break;
      case F8:
          save_signal();
          break;
      case F9:
          load_signal();
          break;
      case F10:
          normal_mode();
          exit(0);
    } /* command switch */

} /* end of main */ autozero_signal()
{
  printbottom("Adjust the hardware for autozero,
  press any key when ready");

load_signal()
{
int con;
  loadbuf(buf, points*xch, &con);
  if( con != 0 ) display_signal();
} /* load_signal */ display_signal()
{
  prof_format(buf, points, xch, prof1);
  prof1_prof2(prof1, points, xch, prof2);
  prof1_prof3(prof1, points, xch, prof3);
  crt_cls();
  disp_profile(prof1, XORIG1, "flat", xintp, xch, points);
  disp_profile(prof2, XORIG2, "flat", xintp/2, xch*2, points);
  disp_profile(prof3, XORIG3, "flat", xintp/2, xch*2, points);
  disp_profile(prof3, XORIG4, "line", xintp/2, xch*2, points);
  crt_setcurpos(0,0);
  printf("%d %d", disp_step, kintp);
} /* display_signal */
```

```
acquire_signal()
{
int dc;
  printbottom("Acquiring signal");
  acquire(buff, (D_RATIO * POINTS), xch);
  decimt(buff, buf, points, xch, D_RATIO);
  offset_removal(buf, error, points, xch);
  dc = mean_of(buf, points*xch);
  dc_removal(buf, dc, points, xch);
  flip(buf, points*xch);
  display_signal();
  crt_setcurpos(6, 0);
  printf("%d", dc);
} /* acquire_signal */ save_signal()
{
 savebuf(buf, points*xch);
} /* save_signal */ int prof1, points, xch, prof2;
{
 int i;
   for(i=0; i<points; i++)
      {
       interp_line(prof1[i], intp_tmp, 2, xch);
       integrate(intp_tmp, 2*xch, prof2[i]);
      }
} /* prof1_prof2 */

/*
** prof1_prof3() transforms the first profile format
** to the third profile format
*/ prof1_prof3(prof1, points, xch, prof3)
int prof1, points, xch, prof3;
{
int i;
  for(i=0; i<points; i++)
     {
      integrate(prof1[i], xch, intg_tmp);
      interp_filter(intg_tmp, prof3[i], xch, kintp);
     }
} /* prof1_prof3 */ disp_profile(prof, xorig, mode, xintp, xch, numscan)
int **prof, xorig, xintp, xch, numscan;
char *mode;
{
int i, j;
int disp_start = YORIG, disp_sz;
  disp_sz = xch * xintp;
  for(i=0, j=disp_start; i<numscan; i++, j-=disp_step)
     {
      if   (*mode == 'I') interp_line(prof[i], disp_tmp,
        xintp, xch);
```

```
/*
** pro_format() transforms raw data format to the first
** display profile format
*/ prof_format(inter, points, xch, profile)
int *inter, points, xch, **profile;
{
int i, j;
  for(j=0; j<points; j++)
     for(i=0; i<xch; i++)
        profile[j][i] = *inter++;
} /* prof_format */

/*
** prof1_prof2() transforms the first profile format
** to the second profile format
*/ prof1_prof2(prof1, points, xch, prof2)
int i;
  error = (int *) calloc(xch, sizeof(int));
  disp_tmp = (int *) calloc(xch*xintp, sizeof(int));
  intp_tmp = (int *) calloc(xch*2, sizeof(int));
  intg_tmp = (int *) calloc(xch, sizeof(int));
  buf  = (int *) calloc(points*xch, sizeof(int));
  buff = (int *) calloc(AUTOSIZE*xch, sizeof(int));
      /* for autozero, acquire AUTOSIZE points */
  prof1 = (int **) calloc(points, sizeof(int *));
     for(i=0; i<points; i++)
         prof1[i] = (int *) calloc(xch, sizeof(int));
     /* prof1 is a (points X xch) 2-d array
  prof2 = (int **) calloc(points, sizeof(int *));
     for(i=0; i<points; i++)
         prof2[i] = (int *) calloc(2*xch, sizeof(int));
  prof3 = (int **) calloc(points, sizeof(int *));
     for(i=0; i<points; i++)
         prof3[i] = (int *) calloc(2*xch, sizeof(int));
     /* prof2 & prof3 are (points X 2*xch) 2-d arrays */
} /* memory_allocation */
```

```
            else /* if *mode == 'f' or anything else */
                    intrp_flat(prof[i], disp_tmp, xintp, xch);
            drawscan(disp_tmp, disp_sz, xorig, j);
        } /* for i, j */
} /* disp_profile */ memory_allocation()
{
char *calloc();
```

LISTING 3: DISPLAY.C

```c
#include <stdio.h>
#define scancolor 12

/*
** drawscan() draws a scan line as an x-y graph at
** the coordinate (x,y) grid (640 X 350) offset by
** (xorig, yorig)
*/ drawscan(buf, points, xorig, yorig)
int *buf, points, xorig, yorig;
{
int v, u, i;

begin_pix(scancolor);

v = yorig + *buf;
  if(v < 0)  v = 0;
  else if(v > 350) v = 350;

points += (xorig-1);
  for (i=xorig; i<points; i++)
        {
        u = yorig + * ++buf;
        if(u < 0)  u = 0;
        else if(u > 350) u = 350;
        if(v<u)
            for(; v<u; v++)
                    ega_draw_pix(i, 350-v);
        else if(v>u)
            for(; v>u; v--)
                    ega_draw_pix(i, 350-v);
        else  ega_draw_pix(i, 350-v);
        } /* for i */ begin_prf();

} /* drawscan */

/*
** integrate() integrates buf to inter; inter and buf
** can be the same array
*/ integrate(buf, xpoints, inter)
int i;
 for(i=0; i<xpoints; i++)
        {
        a += buf[i];
        inter[i] = a;
        }
} /* integrate */

/* intp_flat() does step interpolation */ intp_flat(y, xintp, ybuf)
int y, xintp, *ybuf;
{
int i;
  for(i=0; i<xintp; i++) ybuf[i] = y;
} /* intp_flat */

/* intp_line() does piecewise interpolation */ intp_line(yb, ye, xintp, ybuf)
int yb, ye, xintp, *ybuf;
{
int a, b, i;
  a = 0;
  b = ( (ye-yb)*100 )/xintp;
  for(i=0; i<xintp; i++)
        {
        ybuf[i] = yb + ( (a+50)/100 );
        a += b;
        }
} /* intp_line */

/* intp_fltr() does bandpass filter interpolation */ intp_fltr(xm, x0, x1, x2, k, ybuf)
int xm, x0, x1, x2, k, *ybuf;
{
int a, b;
  ybuf[0] = x0;
  a = ( ((x0+x1)*10)/20 ) * (16+k);
  b = ( ((xm+x2)*10)/20 ) * k;
  ybuf[1] = (a-b)/16
} /* intp_fltr */
```

LISTING 3: CONTINUED

```c
int *buf, xpoints, *inter;
{
long a = 0;
/*
** interp_flat() uses intp_flat() to do step
** interpolation
*/ interp_flat(real_dat, disp_dat, xintp, xch)
int *real_dat, *disp_dat, xintp, xch;
{
int i, j;
  for(i=0, j=0; i<xch; i++, j+=xintp)
      intp_flat(real_dat[i], xintp, disp_dat+j);
} /* interp_flat */

/*
** interp_line() uses intp_line() to do piecewise
** interpolation
*/ interp_line(real_dat, disp_dat, xintp, xch)
int *real_dat, *disp_dat, xintp, xch;
{
int i, j;
  for(i=0, j=0; i<xch-1; i++, j+=xintp)
      intp_line(real_dat[i], real_dat[i+1], xintp,
        disp_dat+j);
  intp_line(real_dat[i], real_dat[i], xintp, disp_dat+j);
} /* interp_line */

/*
** interp_filter() uses intp_fltr() to do bandpass
** filter interpolation
*/ interp_filter(buf, inter, xpoints, k)
int *buf, *inter, xpoints, k;
{
int i=0;
  intp_fltr(buf[i], buf[i], buf[i+1], buf[i+2], k,
    inter+2*i);
  i = xpoints - 1;
  intp_fltr(buf[i-1], buf[i], buf[i], buf[i], k,
    inter+2*i);
  i = xpoints - 2;
  intp_fltr(buf[i-1], buf[i], buf[i+1], buf[i+1], k,
    inter+2*i);
  for(i=1; i<xpoints-2; i++)
      intp_fltr(buf[i-1], buf[i], buf[i+1], buf[i+2],
        k, inter+2*i);
/*
** begin_pix sets the EGA registers to
** non-xor graphic states
*/ begin_pix(color)
int color;
} /* interp_filter */ include <dos.h>

/*
** graph_mode() sets the screen to EGA high
** resolution mode(640x350)
*/ graph_mode()
{
union REGS regs;
  regs.h.ah = 0;
  regs.h.al = 0x10;
  int86(0x10, ®s, ®s);
} /* graph_mode */

/*
** normal_mode() sets the screen to the standard
** text mode
*/ normal_mode()
{
union REGS regs;
  regs.h.ah = 0;
  regs.h.al = 0x03;
  int86(0x10, ®s, ®s);
} /* normal_mode */

/*
** begin_prf sets the EGA registers to the default
** states
*/ begin_prf()
{
  outp(0x3ce, 0x01); outp(0x3cf, 0x00);
  /* set/reset register normal */
  outp(0x3ce, 0x03); outp(0x3cf, 0x00);
  /* no xor */
  outp(0x3ce, 0x08); outp(0x3cf, 0xff);
  /* mask to normal (0xff) */
} /* begin_prf */
```

```c
{
    outp(0x3ce, 0x01); outp(0x3cf, 0x0f);
    /* set/reset register enabled */
    outp(0x3ce, 0x03); outp(0x3cf, 0x00);
    /* xor disabled */
    outp(0x3c4, 0x02); outp(0x3c5, 0xff);
    /* color mask set to (0xff) */
    outp(0x3ce, 0x00); outp(0x3cf, color);
    /* set color */
} /* begin_pix */
```

LISTING 4: STORAGE.C

```c
#include <sys\types.h>
#include <sys\stat.h>
#include <stdio.h>
#include <ctype.h>
#define BOTTOM 24
/* second last line on the EGA screen */

/*
** savebuf() saves the contents of the buffer to a
** file which is specified by input from the user
*/ savebuf(buf, bufsize)
int *buf, bufsize;
{
FILE *fp, *getfile();
int i, ch;
 fp = getfile("wb");
 i = (int)fp;
 if( i == -10000 )
     {
     printbottom("file not saved");
     return;
     }
 if( write(fileno(fp), buf, bufsize*2) == -1 )
     {
     perror("DISKWRITEERROR");
     exit(1);
     }
 fclose(fp);
} /* savebuf */

/*
** loadbuf() loads the buffer with data from a
** file specified by the user
*/ loadbuf(buf, bufsize, con)
int *buf, bufsize;
int *con;
{
FILE *fp, *getfile();
int i;
 fp = getfile("rb");
 i = (int)fp;
```

```c
    printbottom("file not found");
    return;
    }
*con = 1;
if (read(fileno(fp), buf, bufsize*2) == -1){
    perror("DISKREADERROR");
    exit(1);
    }
fclose(fp);
} /* loadbuf */

/*
** getfile() opens a file with access mode, after
** getting the file name from the user
*/

FILE *getfile(mode)
char *mode;
{
int eschar, ch;
char buffer[40], line[50];
FILE *fp;
struct stat stbuf;

eschar = no_echo_gets("Enter file name > ",
  buffer);
 if( eschar != 0 ) return( (FILE *)(-10000) );
 sprintf(line, "dat\\%s", buffer);

checkfile:
while( (*mode == 'r') &&
 (stat(line, &stbuf) == -1) )
     {
     eschar =
     no_echo_gets("file does not exit;
     Re-enter filename > ", buffer);
     if( eschar != 0 )
         return( (FILE *)(-10000) );
     sprintf(line, "dat\\%s", buffer);
     } if( (*mode == 'w') &&
 (stat(line, &stbuf) != -1) )
     {
     printbottom("file exits, overwrite(y/n)? ");
     ch = getch();
     putch(ch);
```

LISTING 4: CONTINUED

```c
if( i = = -10000 )
    {
    *con = 0;

if( (fp = fopen(line, mode)) ! = NULL )
    return(fp);
else {
    eschar = no_echo_gets("filename invalid;
    re-enter file name > ", buffer);
    if( eschar ! = 0 ) return( (FILE *)(-10000) );
    sprintf(line, "dat\\%s", buffer);
    goto checkfile;
    }

} /* getfile */

/*
** no_echo_gets() has the similar function as
** gets(), except it does not echo the CR
*/ no_echo_gets(request, buffer)
char *request, *buffer;
{
int i, ch, icursor;
    icursor = printbottom(request);
    for(i=0;;i++)
        {
        if( (ch = getch()) = = 27 ) return(1);
        else if( ch = = 8 )
            {
            if(i>0) {
                i -= 2;
                icursor--;
                crt_setcurpos(icursor, BOTTOM);
                putch(32);
                crt_setcurpos(icursor, BOTTOM);
                }
            else i--;
            } /* ch = = 8 */
        else if( ch = = 13 ) break;
        else {
            putch(ch);
            buffer[i] = ch;
            icursor++;
            }
        } /* for i */
buffer[i] = '\0';
return(0);
} /* no_echo_gets */
```

```c
if( ch ! = 'y' ) return((FILE *)(-10000));
} /* file exits */

/* printbottom() prints one line at row 24 */ printbottom(ch)
char *ch;
{
int i, count;
    crt_setcurpos(0,BOTTOM);
    printf("%s", ch);
    for(count=0; *ch++ ! = '\0'; count++) ;
    for(i=count; i<78; i++) putch(32);
    crt_setcurpos(count+1, BOTTOM);
    return(count+1);
} /* printbottom */

/*
** noechogetint() gets an integer from the consol
** without echoing the CR
*/ noechogetint(request)
char *request;
{
int i, ch, count;
char buffer[40];
    while(1) {
        if( no_echo_gets(request, buffer) = = 0 )
            {
            for(i=0, count=0;
                (ch = buffer[i]) ! = '\0'; i++)
                    if( !isdigit(ch) ) count++;
            if(count = = 0) return( atoi(buffer) );
            }
    } /* while(1) */
} /* noechogetint */
```

LISTING 5: ACQUIRE.C

```c
#define p_data       0x2F8
#define p_status     0x2FD
#define p_set        0x2FB
#define p_rate       0x2F9
/* port addresses for serial controller */
#define REQUEST 0
```

```c
autozero(inter, error, points, xch)
int *inter, *error, points, xch;
{
int i, j, *tmp;
long ave;
```

```c
/*
** acquire() gets points data from com2 and
** stores them in buf
*/ acquire(buf, points, xch)
int *buf, points, xch;
{
register a, b;
int j;

outp(p_set,0x83);
    outp(p_data,0xC);
    outp(p_rate,0x0);
    outp(p_set,0x3);

a = inp(p_data);
    a = inp(p_data);

while(points--)
        {
        do  {
             b = inp(p_status);
             } while( (b & (0x20)) == 0 );

a = REQUEST;
        outp(p_data, a);

j = xch;
        while(j--)
            {
            do  {
                 b = inp(p_status);
                 } while( (b & (0x01)) == 0 );
             *buf++ = inp(p_data);
             } /* while j */

} /* while points */

} /* acquire */ tmp = inter + i;
        for(j=0; j<points; j++)
            {
            *tmp -= error;
            tmp += xch;
            }
        }
} /* dc_removal */

/* flip() reverses the polarity of buf */ flip(buf, points)
int *buf, points;
{
  while(points--)
        {
```

```c
for(i=0; i<xch; i++)
    {
    tmp = inter + i;
    ave = 0;
    for(j=0; j<points; j++)
        {
        ave += *tmp;
        tmp += xch;
        }
    error[i] = ave/points;
    }
} /* autozero */

/*
** offset_removal() removes the autozero error
** from the raw signal
*/ offset_removal(inter, error, points, xch)
int *inter, *error, points, xch;
{
int i, j, *tmp;
  for(i=0; i<xch; i++)
    {
    tmp = inter + i;
    for(j=0; j<points; j++)
        {
        *tmp -= error[i];
        tmp += xch;
        }
    }
} /* offset_removal */

/* dc_removal() removes the dc from the raw signal */ dc_removal(inter, error, points, xch)
int *inter, error, points, xch;
{
int i, j, *tmp;
  for(i=0; i<xch; i++)
    {
        {
        *tp2 = *tp1;
        tp2 += xch;
        tp1 += d_ratio;
        }
    } /* for i */
} /* decimt */
```

```
    *buf = -*buf;
    buf++;
    }
} /* flip */

/* mean_of() gets the mean of buf */ mean_of(buf, points)
int *buf, points;
{
int i = points;
long j = 0;
  while(i--) j += *buf++;
  j /= points;
  i = j;
  return(i);
} /* mean_of */

/* decimt() decimates buff to buf */ decimt(buff, buf, points, xch, d_ratio)
int *buff, *buf, points, xch, d_ratio;
{
int i, j, *tp1, *tp2;
  d_ratio *= xch;
  for(i=0; i<xch; i++)
      {
      tp1 = buff + i;
      tp2 = buf + i;
      for(j=0; j<points; j++)
```

LISTING 6: CONSOL.ASM

```
        include    dos.mac                      ; crt_setcurpos sets cursor position at (x, y)
        include    cmacros.inc                  ; synopsis: crt_setcurpos(char x, char y);

sBegin    CODE                                  cProc    crt_setcurpos, <NEAR, PUBLIC>
assumes   CS, CODE
assumes   DS, DATA                                       parmB    x
                                                         parmB    y ; ega_draw_pix puts a point at coordinate (x, y)  cBegin    crt_setcurpos
; synopsis: ega_draw_pix(int x, int y);
                                                         mov   ah, 02h
cProc     ega_draw_pix, <NEAR, PUBLIC>                   mov   bh, 0      ; graphic page zero
                                                         mov   dl, x
          parmW    x                                     mov   dh, y
          parmW    y                                     int   10h        ; transfer to BIOS cBegin    ega_draw_pix                          cEnd    crt_setcurpos mov  ax, 0A000h
          mov  es, ax       ; es points to graphic segment  ; crt_cls clears the screen except the bottom line
                                                            ; synopsis: crt_cls();
          mov  ax, y
          mov  cl, 06h                          cProc    crt_cls, <NEAR, PUBLIC>
          shl  ax, cl                           cBegin   crt_cls
          mov  di, ax
          mov  ax, y                                    mov ax, 0600h ; clear screen with scroll
```

```
        mov  cl, 04h
        shl  ax, cl
        add  di, ax      ; di = y*80 mov  ax, x
        mov  cl, 03h
        shr  ax, cl
        add  di, ax      ; di += (x>>3)

mov  cx, x
        and  cl, 07h
        mov  ah, 080h
        shr  ah, cl      ; ah = mask mov  al, 08h
        mov  dx, 03CEh
        out  dx, al
        mov  al, ah
        mov  dx, 03CFh
        out  dx, al      ; output mask mov  al, es:[di] ; address the pixel
        mov  es:[di], al cEnd    ega_draw_pix
```

```
        mov  bh, 0
        mov  cx, 0
        mov  dh, 23      ; a 25 row by
        mov  dl, 79      ; 80 column screen
        int  10h         ; transfer to BIOS cEnd    crt_cls ; command fetches an undecoded key from keyboard
; synopsis: int command();

cProc   command, <NEAR, PUBLIC>
cBegin  command mov  ah, 0
        int  16h         ; transfer to BIOS
        mov  al, ah
        mov  ah, 0 cEnd    command sEnd    CODE

End
```

LISTING 7: ALT.ADF

```
DSL-AV-001
0.00
EP900
Digital Controller
NETMAP Version 4.52, Baseline 34.1, 1/15/87
OPTIONS: TURBO=OFF
PART: EP900
INPUTS:
    CLOCK1@1,
    CLOCK2@21,
    DR@22,
    TBRE@19,
    AT@17,
    R7@39,
    R6@2,
    R5@38,
    R4@3,
    R3@37,
    R2@4,
    R1@24,
    R0@23
OUTPUTS:
    CR@28,
    P0@8,
    P1@9,
    P2@10,
    P3@11,
    P4@12,
    P5@13,
    P6@14,
    P7@15,
```

```
P1 = RONF (P2r1,CLK1,GND,GND,VCC)
P2 = RONF (P2r,CLK1,GND,GND,VCC)
P3 = RONF (P3r,CLK1,GND,GND,VCC)
P4 = RONF (P4r,CLK1,GND,GND,VCC)
P5 = RONF (P5r,CLK1,GND,GND,VCC)
P6 = RONF (P6r,CLK1,GND,GND,VCC)
P7 = RONF (P7r2,CLK1,GND,GND,VCC)
P8 = RONF (P8r,CLK1,GND,GND,VCC)
DRR,DRRf = JOJF
   (DRRj,CLK2,DRRk,GND,GND,VCC)
TBRL = JONF
   (TBRLj,CLK2,TBRLk,GND,GND,VCC)
CONV = JONF
   (CONVj,CLK2,CONVk,GND,GND,VCC)
K0,K0f = RORF (K0r,CLK1,GND,GND,VCC)
K1,K1f = RORF (K1r,CLK1,GND,GND,VCC)
K2,K2f = RORF (K2r,CLK1,GND,GND,VCC)
C0,C0f = TOTF (K2f,CLK2,DRRf,GND,VCC)
C1,C1f = TOTF (C1t,CLK2,DRRf,GND,VCC)
C2,C2f = TOTF (C2t,CLK2,DRRf,GND,VCC)
C3,C3f = TOTF (C3t,CLK2,DRRf,GND,VCC)
C4,C4f = TOTF (C4t,CLK2,DRRf,GND,VCC)
C5,C5f = TOTF (C5t,CLK2,DRRf,GND,VCC)
C6,C6f = TOTF (C6t,CLK2,DRRf,GND,VCC)
C7,C7f = TOTF (C7t,CLK2,DRRf,GND,VCC)
CRt = OR (CRt1,CRt2)
CLK2 = INP (CLOCK2)
P0r1 = AND (bC7f,bC6f,bC5f,bC0f)
CLK1 = INP (CLOCK1)
P2r = OR (P3r1,P2r2)
P3r = OR (P4r1,P3r2)
P4r = OR (P5r1,P4r2)
P5r = OR (P6r1,P5r2,P1r2)
P6r = OR (P7r1,P6r2)
```

```
       P8@16,
       DRR@25,
       TBRL@26,
       CONV@27, ←
       K0@5,
       K1@6,
       K2@7,
       C0@36,
       C1@35,
       C2@34,
       C3@33,
       C4@32,
       C5@31,
       C6@30,
       C7@29
NETWORK:
    CR,CRf = TOTF (CRt,CLK2,GND,GND,VCC)
    P0 = RONF (P0r,CLK1,GND,GND,VCC)

C7t = AND (K2f,C0f,C1f,C2f,C3f,C4f,C5f,C6f)
    CRt1 = AND (K2f,CRf)
    CRt2 = AND (K2f,C0f)
    bC7f = NOT (C7f)
    bC6f = NOT (C6f)
    bC5f = NOT (C5f)
    bC0f = NOT (C0f)
    P1r1 = AND (bC0f,C5f,bC6f,bC7f)
    P1r2 = AND (C0f,bC5f,bC6f,bC7f)
    P2r1 = AND (bC0f,bC5f,C6f,bC7f)
    P2r2 = AND (C0f,C5f,bC6f,bC7f)
    P3r1 = AND (bC0f,C5f,C6f,bC7f)
    P3r2 = AND (C0f,bC5f,C6f,bC7f)
    P4r1 = AND (bC0f,bC5f,bC6f,C7f)
    P4r2 = AND (C0f,C5f,C6f,bC7f)
    P5r1 = AND (bC0f,C5f,bC6f,C7f)
    P5r2 = AND (C0f,bC5f,bC6f,C7f)
    P6r1 = AND (bC0f,bC5f,C6f,C7f)
    P6r2 = AND (C0f,C5f,bC6f,C7f)
    P7r1 = AND (bC0f,C5f,C6f,C7f)
    P7r2 = AND (C0f,bC5f,C6f,C7f)
    bAT = NOT (AT)
    DR = INP (DR)
    AT = INP (AT)
    bC1f = NOT (C1f)
    bC3f = NOT (C3f)
    bC2f = NOT (C2f)
    bK0f = NOT (K0f)
    bK2f = NOT (K2f)
    K1r1 = AND (K0f,bK1f)
    K1r2 = AND (bK0f,K1f)
    bK1f = NOT (K1f)
    bC4f = NOT (C4f)
    RR0 = INP (R0)
    RR1 = INP (R1)
    RR2 = INP (R2)
    RR3 = INP (R3)
    RR4 = INP (R4)
    RR5 = INP (R5)
    RR6 = INP (R6)
    RR7 = INP (R7)
    TB = INP (TBRE)
    P0r = OR (P0r1,P1r1)
ENDS

P8r = AND (C0f,C5f,C6f,C7f)
    DRRj = AND
        (C5f,C6f,AT,C0f,C1f,C2f,C3f,C4f,C7f)
    DRRk = OR (bAT,DR)
    TBRLj = AND (C2f,C0f,C1f,C3f,C4f)
    TBRLk = AND (C4f,C3f,C2f,bC1f,C0f)
    CONVj = AND (bC3f,C4f,C2f,bC1f,bC0f)
    CONVk = AND (bC3f,C4f,bC2f,bC1f,bC0f)
    K0r = AND (bK0f,bK2f)
    K1r = OR (K1r1,K1r2)
    K2r = AND (K0f,K1f)
    C1t = AND (K2f,C0f)
    C2t = AND (K2f,C0f,C1f)
    C3t = AND (K2f,C0f,C1f,C2f)
    C4t = AND (K2f,C0f,C1f,C2f,C3f)
    C5t = AND (K2f,C0f,C1f,C2f,C3f,C4f)
    C6t = AND (K2f,C0f,C1f,C2f,C3f,C4f,C5f)
```

Various modifications to the present invention are possible within the scope of the following claims and may occur to those skilled in the art.

I claim:

1. Electrostatic imaging apparatus for imaging the surface of an object located nearby, said apparatus comprising:
   (a) a plurality of electrostatic radiators;
   (b) signal generating means operatively connected to said radiators for driving said radiators in pairs with opposite phase clock signals to produce an electrostatic field; and,
   (c) electrostatic signal detection and processing means spaced from said radiators for sensing field characteristics of said field as modified by the presence of said nearby object within said field and for producing in response to said sensed field characteristics output signals representative of a surface profile of said object.

2. Electrostatic imaging apparatus as defined in claim 1, said signal detection and processing means comprising a plurality of electrostatic detectors positioned in fixed relation to said radiators.

3. Electrostatic imaging apparatus as defined in claim 1, said signal detection and processing means including means responsive to said output signals for producing an image of said object in at least two dimensions.

4. Electrostatic imaging apparatus as defined in claim 1, including two axially aligned electrostatic radiators and an electrostatic detector axially aligned with said two radiators.

5. Electrostatic imaging apparatus as defined in claim 1, including two co-axially spaced electrostatic radiators and an electrostatic detector positioned co-axially therebetween.

6. Electrostatic imaging apparatus as defined in claim 1, including two co-axially spaced electrostatic radiators and a plurality of electrostatic detectors positioned therebetween.

7. Electrostatic imaging apparatus as defined in claim 1, wherein said radiators and an electrostatic detector are arranged in an X-Y pattern array.

8. Electrostatic imaging apparatus as defined in claim 2, wherein said radiators and said detectors are arranged in an X-Y matrix array, the positions of radiators within said array alternating with those of detectors within said array.

9. Electrostatic imaging apparatus as defined in claim 1, said electrostatic radiators being interleaved.

10. Electrostatic imaging apparatus as defined in claim 1, said electrostatic radiators being positioned within an encircling electrostatic detector.

11. Electrostatic imaging apparatus as defined in claim 1, wherein the dimensions of at least one of said radiators differs substantially from the dimensions of at least one other of said radiators.

12. Electrostatic imaging apparatus as defined in claim 1, comprising two parallel rows of interdigitated pairs of electrostatic radiators.

13. Electrostatic imaging apparatus as defined in claim 3, wherein said radiators and an electrostatic detector are arranged in an X-Y pattern array.

* * * * *